United States Patent
Nostrini et al.

(10) Patent No.: US 11,847,310 B2
(45) Date of Patent: Dec. 19, 2023

(54) SYSTEM AND METHOD FOR AUTO BINDING GRAPHICS TO COMPONENTS IN A BUILDING MANAGEMENT SYSTEM

(71) Applicant: HONEYWELL INTERNATIONAL INC., Charlotte, NC (US)

(72) Inventors: Marco Nostrini, Charlotte, NC (US); Prabhat Ranjan, Charlotte, NC (US); Rory Foxley, Charlotte, NC (US); Venugopala Kilingar Nadumane, Charlotte, NC (US); Rajiv Ranjan Singh, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 6 days.

(21) Appl. No.: 17/449,892

(22) Filed: Oct. 4, 2021

(65) Prior Publication Data
US 2022/0113853 A1  Apr. 14, 2022

(30) Foreign Application Priority Data
Oct. 9, 2020  (IN) .............................. 202011044012

(51) Int. Cl.
- G06F 3/0482   (2013.01)
- G06F 3/0486   (2013.01)
- G05B 15/02    (2006.01)

(52) U.S. Cl.
CPC .......... G06F 3/0486 (2013.01); G05B 15/02 (2013.01); G06F 3/0482 (2013.01)

(58) Field of Classification Search
CPC ...... G06F 3/0486; G06F 3/0482; G05B 15/02
See application file for complete search history.

(56) References Cited

U.S. PATENT DOCUMENTS

| | | |
|---|---|---|
| 7,082,464 B2 | 7/2006 | Hasan et al. |
| 7,096,164 B1 | 8/2006 | Musharbash |

(Continued)

FOREIGN PATENT DOCUMENTS

| | | |
|---|---|---|
| CN | 110140096 A1 | 8/2019 |
| CN | 111698294 A | 9/2020 |

(Continued)

OTHER PUBLICATIONS

See, Richard, et al. "Development of a user interface for the EnergyPlus whole building energy simulation program." Proceedings of the 12th International IBPSA Conference, Sydney, Australia. 2011, pp. 2919-2926. (Year: 2011).*

(Continued)

*Primary Examiner* — Jennifer N Welch
*Assistant Examiner* — Kuang F Chen
(74) *Attorney, Agent, or Firm* — Seager, Tufte & Wickhem, LLP

(57) ABSTRACT

A method of configuring a building management system for operation, the building management system including a plurality of building system components, the method comprising:
- accessing a widget library, the widget library comprising a plurality of individual images that each represent operation of one or more building system components;
- dragging and dropping one or more individual images from the widget library onto an editor page;
- dragging and dropping one or more points of the one or more building system components onto each of one or more of the individual images on the editor page;
- in response to dragging and dropping the one or more points onto each of one or more of the individual images on the editor page, automatically binding the one or more points with the respective individual image; and (Continued)

saving the individual images along with the binding with their respective one or more points.

16 Claims, 24 Drawing Sheets

(56) References Cited

U.S. PATENT DOCUMENTS

| | | | |
|---|---|---|---|
| 7,308,323 | B2 | 12/2007 | Kruk et al. |
| 7,334,216 | B2 | 2/2008 | Molina-Moreno et al. |
| 7,567,844 | B2 | 7/2009 | Thomas et al. |
| 8,521,708 | B2 | 8/2013 | Ahmed et al. |
| 8,830,267 | B2 | 9/2014 | Brackney |
| 8,930,214 | B2 | 1/2015 | Woolford |
| 9,294,468 | B1 | 3/2016 | Kilbourn |
| 9,323,055 | B2 | 4/2016 | Baillot |
| 9,342,928 | B2 | 5/2016 | Rasane et al. |
| 9,488,992 | B2 | 11/2016 | Laberge et al. |
| 9,571,986 | B2 | 2/2017 | Gottschalk et al. |
| 9,769,151 | B2 | 9/2017 | Klieman et al. |
| 9,998,336 | B2 | 6/2018 | Birze et al. |
| 10,278,048 | B2 | 4/2019 | Sharma et al. |
| 2003/0078798 | A1 | 4/2003 | Zaks et al. |
| 2003/0177205 | A1 | 9/2003 | Liang et al. |
| 2004/0250236 | A1 | 12/2004 | O'Malley et al. |
| 2006/0044307 | A1 | 3/2006 | Song |
| 2006/0050142 | A1* | 3/2006 | Scott ............ G08C 23/04 |
| | | | 348/14.05 |
| 2006/0055704 | A1 | 3/2006 | Kruk et al. |
| 2006/0058900 | A1 | 3/2006 | Johanson et al. |
| 2006/0058923 | A1 | 3/2006 | Kruk et al. |
| 2006/0112073 | A1 | 5/2006 | Jensen et al. |
| 2007/0045433 | A1* | 3/2007 | Chapman ......... G05D 23/1902 |
| | | | 236/46 R |
| 2011/0115816 | A1 | 5/2011 | Brackney |
| 2013/0031202 | A1 | 1/2013 | Mick et al. |
| 2013/0069985 | A1 | 3/2013 | Wong et al. |
| 2013/0169681 | A1 | 7/2013 | Rasane et al. |
| 2013/0212453 | A1 | 8/2013 | Gudai et al. |
| 2014/0282257 | A1 | 9/2014 | Nixon et al. |
| 2015/0062164 | A1 | 3/2015 | Kobayashi et al. |
| 2015/0097706 | A1 | 4/2015 | Perger et al. |
| 2015/0120000 | A1 | 4/2015 | Coffey et al. |
| 2015/0222604 | A1 | 8/2015 | Ylonen |
| 2015/0293508 | A1* | 10/2015 | Piaskowski ......... G05B 15/02 |
| | | | 700/275 |
| 2015/0310664 | A1 | 10/2015 | Boussard et al. |
| 2015/0341390 | A1 | 11/2015 | Kiefer et al. |
| 2016/0019212 | A1 | 1/2016 | Soldani |
| 2016/0042568 | A1 | 2/2016 | Farnham et al. |
| 2016/0095188 | A1 | 3/2016 | Verberkt et al. |
| 2016/0313902 | A1 | 10/2016 | Hill et al. |
| 2017/0005344 | A1 | 1/2017 | Schmid et al. |
| 2017/0018120 | A1 | 1/2017 | Li et al. |
| 2017/0021339 | A1 | 1/2017 | Na et al. |
| 2017/0038945 | A1 | 2/2017 | Beaulieu et al. |
| 2017/0046012 | A1* | 2/2017 | Han ............... G08B 13/19682 |
| 2017/0053441 | A1 | 2/2017 | Nadumane et al. |
| 2017/0091607 | A1 | 3/2017 | Emeis et al. |
| 2017/0213390 | A1 | 7/2017 | Ramachandran et al. |
| 2018/0012173 | A1 | 1/2018 | Leen et al. |
| 2018/0129276 | A1 | 5/2018 | Nguyen et al. |
| 2018/0157321 | A1 | 6/2018 | Liu |
| 2018/0205567 | A1* | 7/2018 | Piaskowski ......... H04L 12/4625 |
| 2018/0217621 | A1 | 8/2018 | Biesterveld et al. |
| 2018/0218538 | A1 | 8/2018 | Short et al. |
| 2018/0218540 | A1 | 8/2018 | Sridharan et al. |
| 2018/0262349 | A1 | 9/2018 | Ranjan et al. |
| 2019/0087076 | A1* | 3/2019 | Dey ............... H04L 12/2818 |
| 2019/0186779 | A1 | 6/2019 | Janakiraman et al. |
| 2019/0310599 | A1 | 10/2019 | Saunders et al. |
| 2019/0355177 | A1 | 11/2019 | Manickam et al. |
| 2021/0248286 | A1 | 8/2021 | Poluri et al. |

FOREIGN PATENT DOCUMENTS

| | | |
|---|---|---|
| WO | 2005109122 A1 | 11/2005 |
| WO | 2017192752 A1 | 11/2017 |

OTHER PUBLICATIONS

Amazon Web Services, Inc., "AWS Certificate Manager FAQ's," 15 pages, 2016.
Amazon Web Services, Inc., "AWS Certificate Manager," Downloadable at https://aws.amazon.com/certificate-manager/, 6 pages, 2016.
https://www.ibm.com/support/knowledgecenter/SSLTBW_2.1.0/com.ibm.zos.v2r1.icha700/toc.htm, "Summary of Steps for Defining a RACF Group," z/OS Security Adminstrator's Guide, 2 pages, 2014.
Schneider Electric, "User Assistance for StruxureWare Data Center Expert (DCE)7.2.2," 3 pages, 2014.
Sun Microsystems, Inc., "iPlanet Certificate Management System Installation and Setup Guide," Chapter 1, 30 pages, Oct. 7, 2002.
Tridium, "Open Integrated Solutions, Automation with the Niagara Framework," 16 pages, 2013.
U.S. Appl. No. 15/980,520, "Building System Maintenance Using mixed Reality", filed May 15, 2018.
Lee, et al., "The Virtual-Augmented-Reality Environment for Building Commission: Case Study", Proceedings of the Fifth International Conferene for Enhanced Builidng Operations, Pittsburgh, Pennsylvania, Oct. 2005, 6 pages.
Akin, et al., "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.
Lee, et al., "The Development of an Augmented Reality-Based Data Visualization System for Commissioning of Air Handling Units", 7th International Conference on Construction Applications of Virtual Reality, Oct. 2007, 10 pages.
Lee, et al., "The Development of an Augmented Reality-Based User Interface to Support Maintenance Fieldwork", Embodying Virtual Architecture: The Third International Conference of the Arab Society for Computer Aided Architectural Design (ASCAAD 2007), Nov. 2007, 8 pages.
Hakkarainen, et al., "Mobile Augmented Reality for Building and Construction", International AR Standards Workshop, Oct. 2010, 3 pages.
PCT/US2018/065970 Search Report and Written Opinion, pp. 13, dated Mar. 22, 2019.
Fiorentino, et al. "Augmented reality on large screen for interactive maintenance instructions", Computers in Industry, 2014, 18 pages.
Busker, "Task Specific Information Visualizations Using Head-Mounted Display Technology", http://essay.utwente.hl/69492/1/Busker,%20B.%200166944%20_%20openbaar.pdf, Apr. 2016, 31 pages. [Secured Download Only at https://essay.utwente.nl/69492/1/Busker%2C%20B.%200166944%20_%20openbaar.pdf] (Abstract Only) (1 page).
Extended European Search Report, Application No. 21155628.7, dated Jun. 21, 2021 (12 pages).
IN First Office Action, IN Application No. 202011044012, India Patent Office, dated May 19, 2022 (6 pages).

* cited by examiner

| A | B | C | D | E | F | G | H | I |
|---|---|---|---|---|---|---|---|---|
| Template Description | | | | | | | | |
| | | | | | | | | |
| | | | | | Slot Name | Inputs | | |
| | | | | | User Tip | Occ_Sched_in16 | HVAC_Mode_in16 | |
| | | | | | Bind Hints | Occ_Sched_in16 | HVAC_Mode_in16 | |
| | | | | | Target Slot Hints | hs:fcu and hs:occ | hs:fcu and hs:vavMode | |
| Network Slot Path | Device Name | Display Name | Position | Unique Device | Description | | | |
| Drivers/bacnetNetwork | RoomTem01 | | | | | | | |
| Drivers/bacnetNetwork | RoomTem02 | | | | | | | |
| Drivers/bacnetNetwork | RoomTem03 | | | | | | | |
| Drivers/bacnetNetwork | RoomTem04 | | | | | | | |
| Drivers/bacnetNetwork | RoomTem05 | | | | | | | |
| Drivers/bacnetNetwork | RoomTem06 | | | | | | | |
| Drivers/bacnetNetwork | RoomTem07 | | | | | | | |
| Drivers/bacnetNetwork | RoomTem08 | | | | | | | |
| Drivers/bacnetNetwork | RoomTem09 | | | | | | | |
| Drivers/bacnetNetwork | RoomTem10 | | | | | | | |

FIG. 23

SYSTEM AND METHOD FOR AUTO BINDING GRAPHICS TO COMPONENTS IN A BUILDING MANAGEMENT SYSTEM

CROSS-REFERENCE TO RELATED APPLICATIONS

This application claims priority pursuant to 35 U.S.C. 119(a) to India Patent Application No. 202011044012, filed Oct. 9, 2020, which application is incorporated herein by reference in its entirety.

TECHNICAL FIELD

The present disclosure relates generally to configuring a building management system. More particularly, the present disclosure relates to methods and systems for more easily configuring a building management system such as an HVAC system, Security system, Access control system and/or other building control system.

BACKGROUND

Building management systems such as HVAC systems can include a large number of individual components that must be configured to work together. This often includes defining a set of properties for each of the individual components, and binding suitable graphics to each component that are viewable by an operator on a building management console during subsequent operation of the building management system. This configuration process of the building management system can be a time-consuming and error-prone process. There is a need for an improved way of designing and configuring building managements systems such as but not limited to an HVAC system, Security system, Access control system and/or other building control system.

SUMMARY

The present disclosure relates generally to methods and systems for configuring a building management system. In one example, a method of configuring a building management system, wherein the building management system includes a plurality of building system components. The method includes accessing a widget library that has a plurality of individual images that each represent operation of one or more building system components. One or more individual images from the widget library are dragged and dropped by the user onto an editor page. One or more points of the one or more building system components are then dragged and dropped onto each of one or more of the individual images on the editor page. In response to the one or more points being dragged and dropped onto each of one or more of the individual images on the editor page, the one or more points of a respective building system component are automatically bound with the corresponding individual image. The individual images along with the binding with their respective one or more points are saved.

In another example, a non-transitory, computer-readable storage medium has instructions stored thereon. When the instructions are executed by one or more processors, the one or more processors are caused to allow a user access to a widget library that includes a plurality of individual images that each represent operation of one or more building system components of a building management system. The user is allowed to drag and drop one or more individual images from the widget library onto an editor page. The user is also allowed to drag and drop one or more points of the one or more building system components onto each of one or more of the individual images on the editor page. The one or more processors are caused to automatically bind the one or more points with the respective individual image in response to a user dragging and dropping the one or more points onto each of one or more of the individual images on the editor page. The one or more processors are caused to then save the individual images along with the binding with their respective one or more points.

In another example, a non-transitory, computer-readable storage medium has instructions stored thereon. When the instructions are executed by one or more processors, the one or more processors are caused to allow a user to drag and drop a template onto an editor page and to look for one or more building components in a building management system database that match the particular points bound in the template. The one or more building components that were found are then displayed for selection by the user. The one or more processors are then caused to receive a selection of one or more of the building components from the user and to copy the template for each of the selected building components. The one or more processors are then caused to update each copy of the template to bind to a corresponding one of the selected building components.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 20-23 are illustrative screen captures pertaining to equipment templates.

Figure 1:
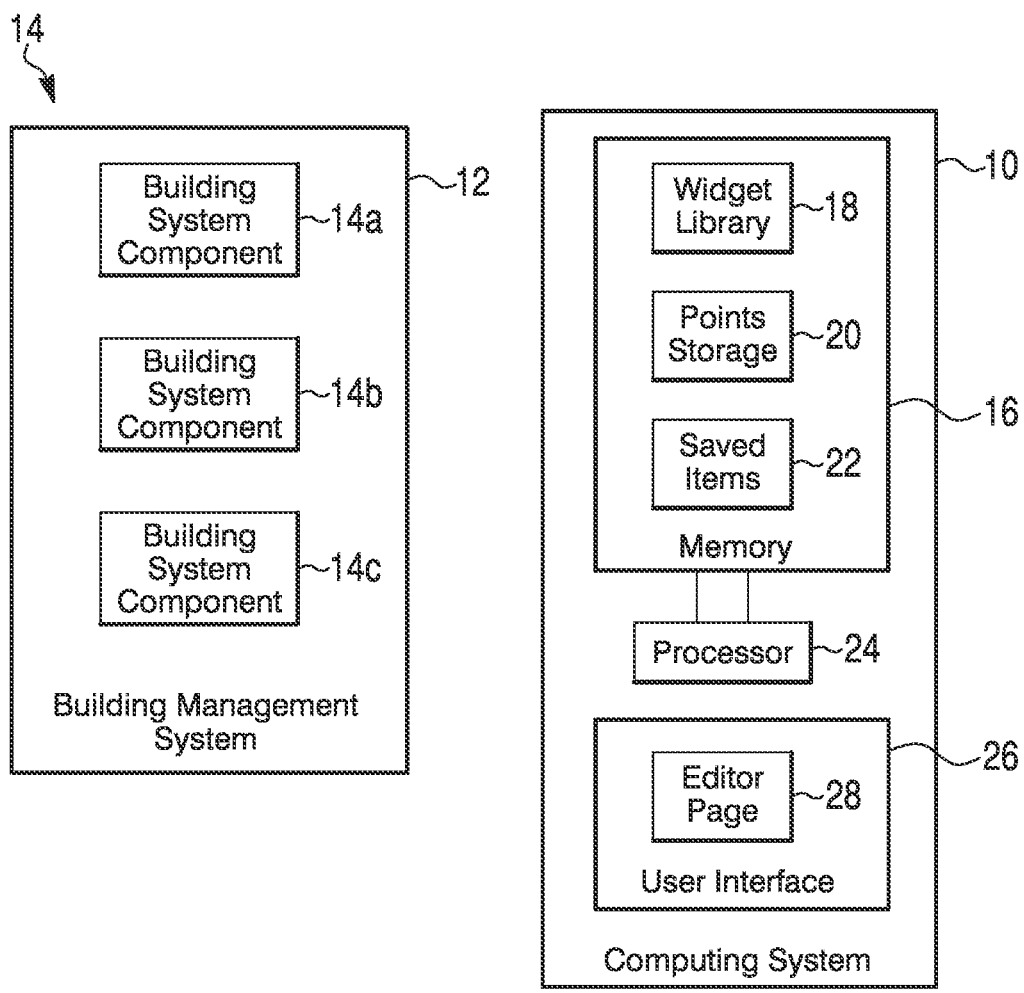
FIG. 1 is a schematic block diagram of an illustrative system for configuring a building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative computing system 10 for configuring an illustrative building management system 12. The building management system 12 may be seen as including several building system components 14, individually labeled as 14a, 14b, 14c. While a total of three building system components 14 are shown, it will be appreciated that this is merely illustrative, as the building management system 12 may include any number of building system components 14, and in some instances may include considerably more than three building system components 14. The building management system 12 may represent any of a variety of different types of building systems. For example, the building management system 12 may represent a Heating, Ventilating and Air Conditioning (HVAC) system. In such a case, the building system components 14 may individually represent various HVAC components. Examples include heating sources and cooling sources such as chillers, heating coils and cooling coils, at least some of which may be included within one or more Air Handling Units (AHUs). An AHU may also include a temperature sensor.

As another example, the building management system 12 may represent a lighting system, a security system and/or an access control system. In the case of a lighting system, the individual building system components 14 may represent individual parts of a lighting system, such as lighting sources, light sensor and controllers that help to operate the lighting system. In the case of a security system, the individual building system components 14 may represent individual parts of a security system, such as control panels, sensors and the like. In some cases, regardless of the identity of the building management system 12, it is contemplated that one or more of the building system components 14 may represent controllers that are configured to control operation of at least some of the other building system components 14.

The computing system 10 may include a memory 16 for storing a Widget Library 18. The Widget Library 18 may include a number of graphical images, some of which can be selected to represent particular building system components 14. Some of the graphical images within the Widget Library 18 may represent state or status values that may be assigned to some of the building system components 14. For example, the Widget Library 18 may include one or more selectable graphics such as an ON status image, an OFF status image, a MANUAL OVERRIDE status image and an ALARM status image. The Widget library may include and/or define several different graphical images that each represent at least part of a particular building system component in a different operational state (e.g. ON state, OFF State, MANUAL OVERRIDE state, ALARM state to name a few). For example, the Widget library may include a graphical image that represent an Air Handling Unit (AHU) that includes a heating unit, a cooling unit and a fan. In some cases, the Widget Library may include a first graphical image for the Air Handling Unit (AHU) with the heating unit OFF, the cooling unit OFF, and the Fan OFF. The Widget Library may include a second graphical image that represents the Air Handling Unit (AHU) with the heating unit OFF, the cooling unit OFF, and the Fan ON. The Widget Library may include a third graphical image that represents the Air Handling Unit (AHU) with the heating unit ON, the cooling unit OFF, and the Fan OFF. The Widget Library may include a Fourth graphical image that represents the Air Handling Unit (AHU) with the heating unit OFF, the cooling unit ON, and the Fan ON. These are just examples. All of these graphical images may be associated with the same Air Handling Unit (AHU), and a particular graphical image may be automatically selected for display depending on the state of the points (e.g. heating unit point, cooling unit point and fan point) of a particular Air Handling Unit (AHU) that the widget is subsequently bound.

The memory 16 may include a Points Storage 20. The Points Storage 20 may store a number of operational and/or control points that correspond to each of the building system components 14 in the building management system 12. As will be discussed, as a user selects particular images from the Widget Library 18 to represent at least some of the building system components 14, and possible at least some of the possible status values for some of the building system components 14, the corresponding operational and/or control points may be retrieved form the Points Storage 20. The appropriate points may be associated with the particular images from the Widget Library 18 for a given building system component 14. The images and the appropriate points may be saved, as will be discussed, within a Saved Items 22 that is provided as part of the memory 16.

In some cases, a processor 24 may facilitate moving data to and from the memory 16, and to a user interface 26. While a single processor 24 is illustrated, it will be appreciated that there may be multiple processors 24 within the computing system 10. The computing system 10 may represent a personal computer. In some cases, the computing system 10 may be spread over multiple personal computers. The computing system 10 may have a cloud server-based component, for example. The user interface 26 may be configured to display information provided from the processor 24. The user interface 26 may be configured to receive information from a user and/or from other sources, and to provide the information to the processor 24. In some instances, the user interface 26 may include a display and a data entry device such as but not limited to a keyboard, a mouse, a trackball, stylus, a touch-sensitive screen, and the like.

The illustrative user interface 26 includes an Editor Page 28. In some instances, the Editor Page 28 may provide a display space that allows a user to place objects onto the display space to be manipulated. This may include placing graphic from the Widget Library 18 on the Editor Page 28. This may include placing other information, such as operational and/or control points, from the Points Storage 20, on the Editor Page 28. The Editor Page 28 may be configured to allow a user to manipulate graphics that are displayed on the Editor Page 28, as well as to allow the user to associate various components that are displayed on the Editor Page 28.

Figure 2:
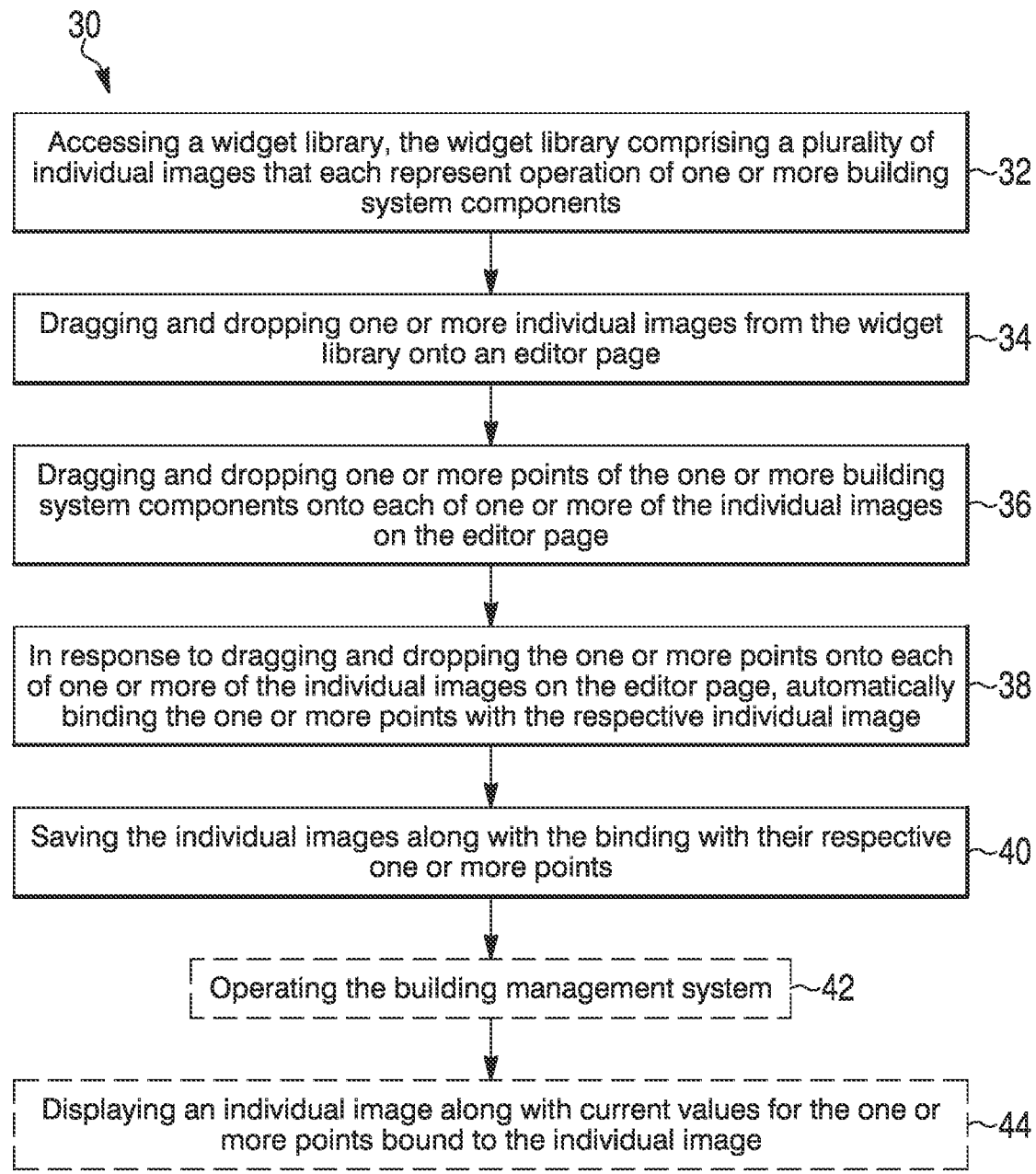
FIG. 2 is a flow diagram showing an illustrative method of configuring a building control system such as that of FIG. 1.

FIG. 2 is a flow diagram showing an illustrative method 30 of configuring a building management system (such as the building management system 12) for operation, where the building management system including a plurality of building system components (such as the building system components 14). A widget library (such as the Widget Library 18) that includes a plurality of individual images each representing operation of one or more of the building system components is accessed, as indicated at block 32. One or more individual images from the widget library are dragged and dropped onto an editor page (such as the Editor Page 28), as indicated at block 34, each representing a different building management system 12 of the building management system. Then, one or more points of the one or more building system components are dragged and dropped onto each of one or more of the individual images on the editor page, as indicated at block 36. The one or more points may, for example, include one or more control points. In some cases, as described above, the widget library may include a plurality of control point status images for a particular building system component that each correspond to a different state of a control point.

Rather than using dragging and dropping as described above, it is contemplated that any other suitable mechanism may be used by a user to instantiate images from the Widget library onto an editor page and/or for associating one or more points with instantiated images. For example, a user may select an image from the widget library and the image may be automatically placed on the editor page at a predetermined location. When so provided, and while not required, the user may then be able to move the image to a desired location on the editor page. With respect to associating points, a user may be able to select or otherwise identify desired points, and then select an instantiated image. The system may then automatically associate the identified points with the selected instantiated image. These are just example alternative mechanisms. The present specification is intended to cover all suitable mechanisms for instantiate images from a Widget library onto an editor page and associating one or more points with instantiated images.

In response to the one or more points being dragged and dropped onto each of the one or more individual images on the editor page, the one or more points are automatically bound with the respective individual image, as indicated at block 38. When a plurality of control point status images are bound to one or more of the points, a corresponding one of the control point status images may be displayed in accordance with a current state of the respective control point.

To illustrate, the plurality of control point images may include one or more of an ON status image, an OFF status image, a MANUAL OVERRIDE status image and an ALARM state image for a particular building system component. Other control point images are also contemplated. The individual images along with the binding with their respective one or more points are saved, as indicated at block 40. In some instances, as optionally indicated at block 42, the building management system may be operated. During operation of the building management system, an individual image may be displayed along with current values for the one or more points that are bound to the individual image on the user interface 26. The user interface 26 may be part of an operator console.

Figure 3:
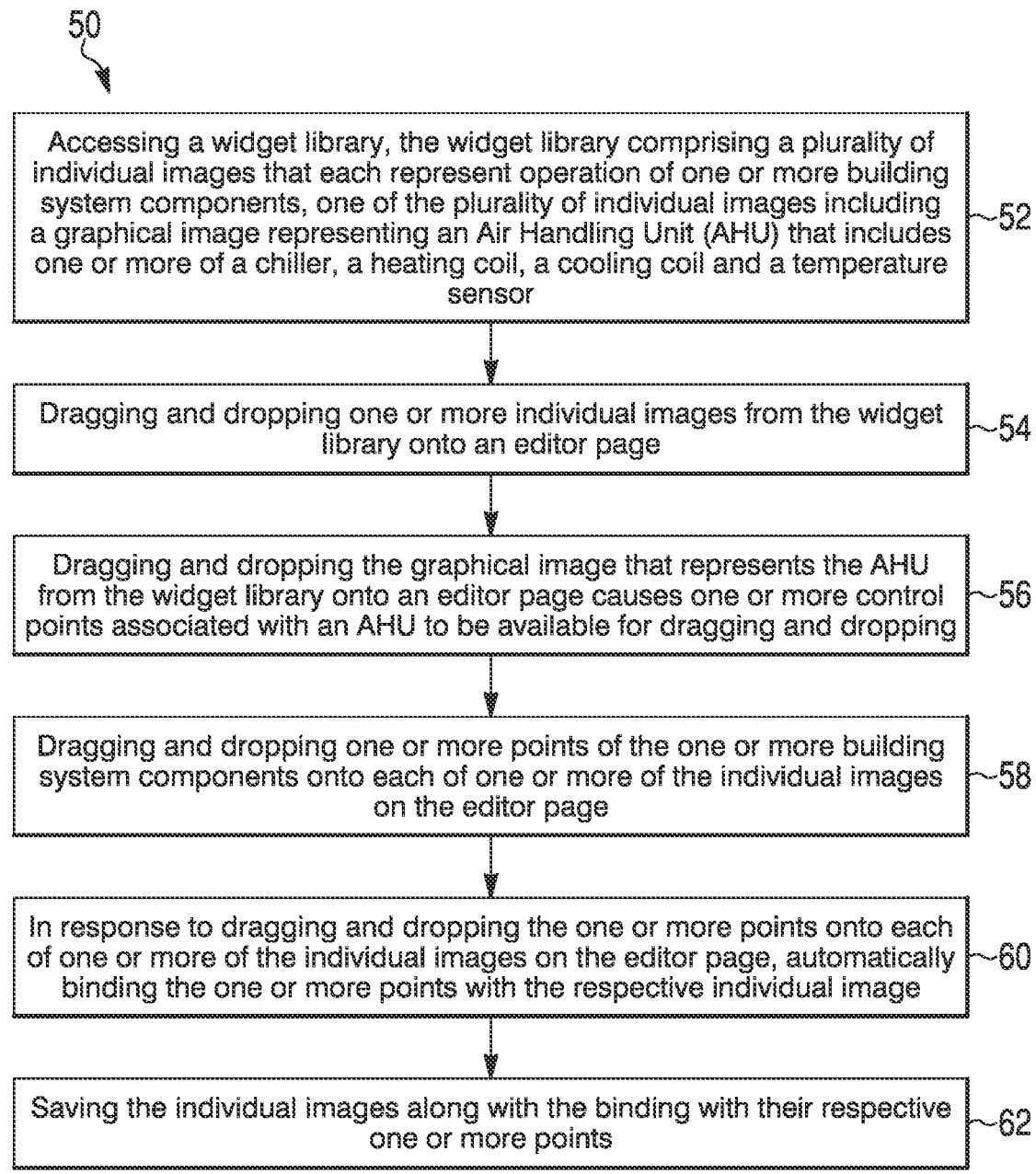
FIG. 3 is a flow diagram showing an illustrative method of configuring a building control system such as that of FIG. 1.

FIG. 3 is a flow diagram showing an illustrative method 50 of configuring a building management system (such as the building management system 12) for operation, where the building management system including a plurality of building system components (such as the building system components 14). A widget library (such as the Widget Library 18) that includes a plurality of individual images each representing operation of one or more of the building system components is accessed, as indicated at block 52. One of the plurality of images within the widget library includes a graphical image that represents an Air Handling Unit (AHU). The AHU may include one or more of a chiller, a heating coil, a cooling coil and a temperature sensor.

One or more individual images from the widget library are dragged and dropped onto an editor page (such as the Editor Page 28), as indicated at block 54. Dragging and dropping a graphical image that represents the AHU from the widget library onto the editor page causes one or more control points associated with an AHU to be available for dragging and dropping, as indicated at block 56. One or more points are then selected, dragged and dropped onto each of one or more of the individual images on the editor page, as indicated at block 58, including selecting, dragging and dropping one or more points associated with the AHU onto the graphical image that represents the AHU. In some cases, the widget library may include a plurality of control point status images associated with the AHU that each correspond to a different state of a control point of the AHU, but this is not required.

In response to the one or more points being dragged and dropped onto each of the one or more individual images on the editor page, the one or more points are automatically bound with the respective individual image, as indicated at block 60. The individual images along with the binding with their respective one or more points are then saved, as indicated at block 62. In some instances, while not illustrated, the building management system may be operated. During operation of the building management system, an individual image may be displayed along with current values for the one or more points that are bound to the individual image in an operator's display.

In some cases, the graphical image that represents an AHU may include two or more different graphical images, where each of the two or more different graphical images represent a different function of the AHU. In such cases, points may be dragged and dropped onto each of the two or more different graphical images representing different functions of the AHU on the editor page. In response to dragging and dropping one or more points onto each of the two or more different graphical images representing a different function of the AHU on the editor page, the one or more points may be automatically bound with the respective ones of the two or more different graphical images representing a different function of the AHU. One of the two or more different graphical images may represent a cooling function of the AHU. One of the two or more different graphical images may represent a heating function of the AHU. One of the two or more different graphical images may represent a fan function of the AHU. These are just examples.

Figure 4:
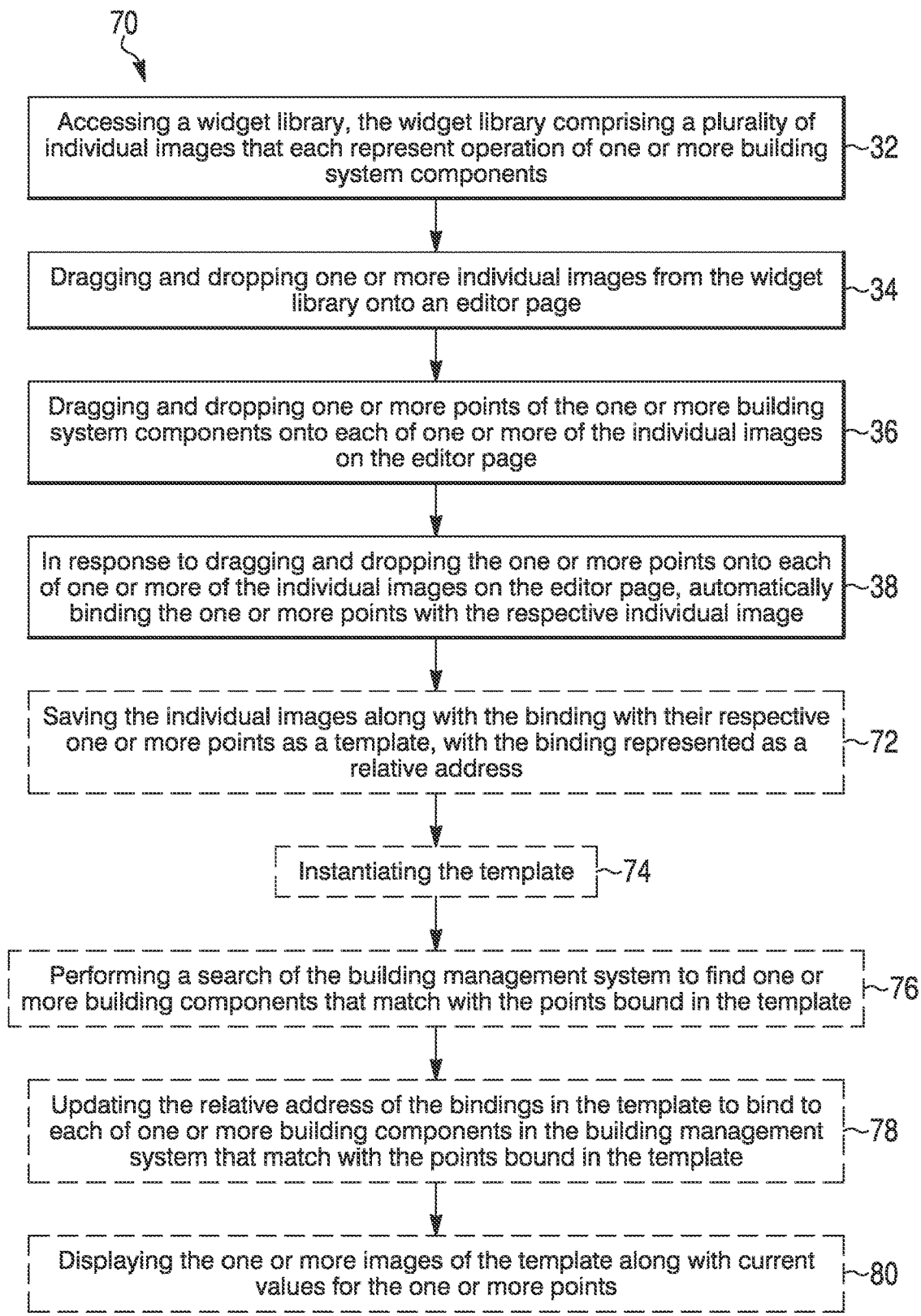
FIG. 4 is a flow diagram showing an illustrative method of configuring a building control system such as that of FIG. 1.

FIG. 4 is a flow diagram showing an illustrative method 70 of configuring a building management system (such as the building management system 12) for operation, where the building management system including a plurality of building system components (such as the building system components 14). A widget library (such as the Widget Library 18) that includes a plurality of individual images each representing operation of one or more of the building system components is accessed, as indicated at block 32. One or more individual images from the widget library are dragged and dropped onto an editor page (such as the Editor Page 28), as indicated at block 34. One or more points of the one or more building system components are then dragged and dropped onto each of one or more of the individual images on the editor page, as indicated at block 36. In response to the one or more points being dragged and dropped onto each of the one or more individual images on the editor page, the one or more points are automatically bound with the respective individual image, as indicated at block 38.

The one or more individual images are saved, along with the binding with their respective one or more points as a template, with the binding represented as a relative address, as indicated at block 72. A template may be used to configure other equipment, either within the same building management system, or perhaps within a different building management system within a different building. The template may be instantiated, as indicated at block 74. A search of the building management system may be performed to find one or more building components in the building management system that match with the points bound in the template, as indicated at block 76. When the search of the building management system finds two or more building components that match with the points bound in the template, the two or more building components may be presented to a user and the user may be allowed to select one or more of the two or more building components. In any event, the relative address of the bindings in the template are updated to bind to each of one or more building components in the building management system that match with the points bound in the template (and/or are selected by a user), as indicated at block 78. During subsequent operation of the building management system, the one or more individual images of the template along with current values for the one or more points are displayed on an operator console for each of the bound one or more building components, as indicated at block 80.

Figure 5:
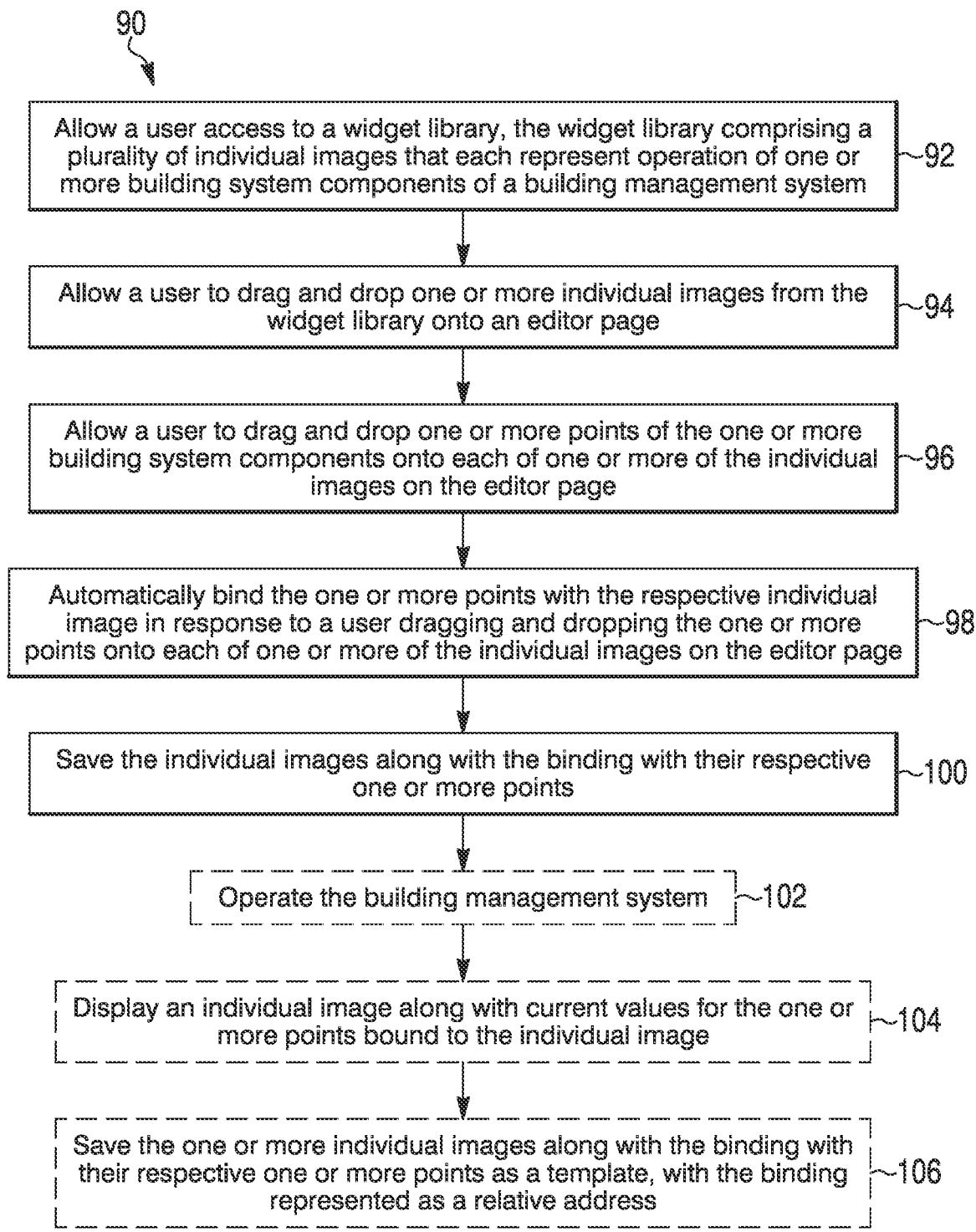
FIG. 5 is a flow diagram showing an illustrative method of configuring a building control system such as that of FIG. 1.

FIG. 5 is a flow diagram showing an illustrative method 90. In the illustrative method of FIG. 5, a user is allowed access to a widget library that includes a plurality of individual images that each represent operation of one or more building system components of a building management system, as indicated at block 92. The user is allowed to drag and drop one or more individual images from the widget library onto an editor page, as indicated at block 94. The user is allowed to drag and drop one or more points of the one or more building system components onto each of one or more of the individual images on the editor page, as indicated at block 96.

In some cases, the points may include one or more control points, and the widget library may include a plurality of control point status images that each correspond to a different state of a control point. The plurality of control point status images may be bound to one or more of the points, and a corresponding one of the control point status images may be displayed, depending on the current state of the respective control point. For example, if the current state of the respective control point is ON, then an ON status image may be displayed. If the current state of the respective control point is OFF, then an OFF status image may be displayed. These are just examples. The one or more points are automatically bound with the respective individual image in response to a user dragging and dropping the one or more points onto each of one or more of the individual images on the editor page, as indicated at block 98. The individual images are saved along with the binding with their respective one or more points, as indicated at block 100.

In some instances, as optionally indicated at block 102, the building management system may be operated. An individual image may be displayed along with current values for the one or more points bound to the individual image, as optionally indicated at block 104. In some cases, as optionally indicated at block 106, the one or more individual images are saved along with the binding with their respective one or more points as a template, with the binding represented as a relative address.

Figure 6:
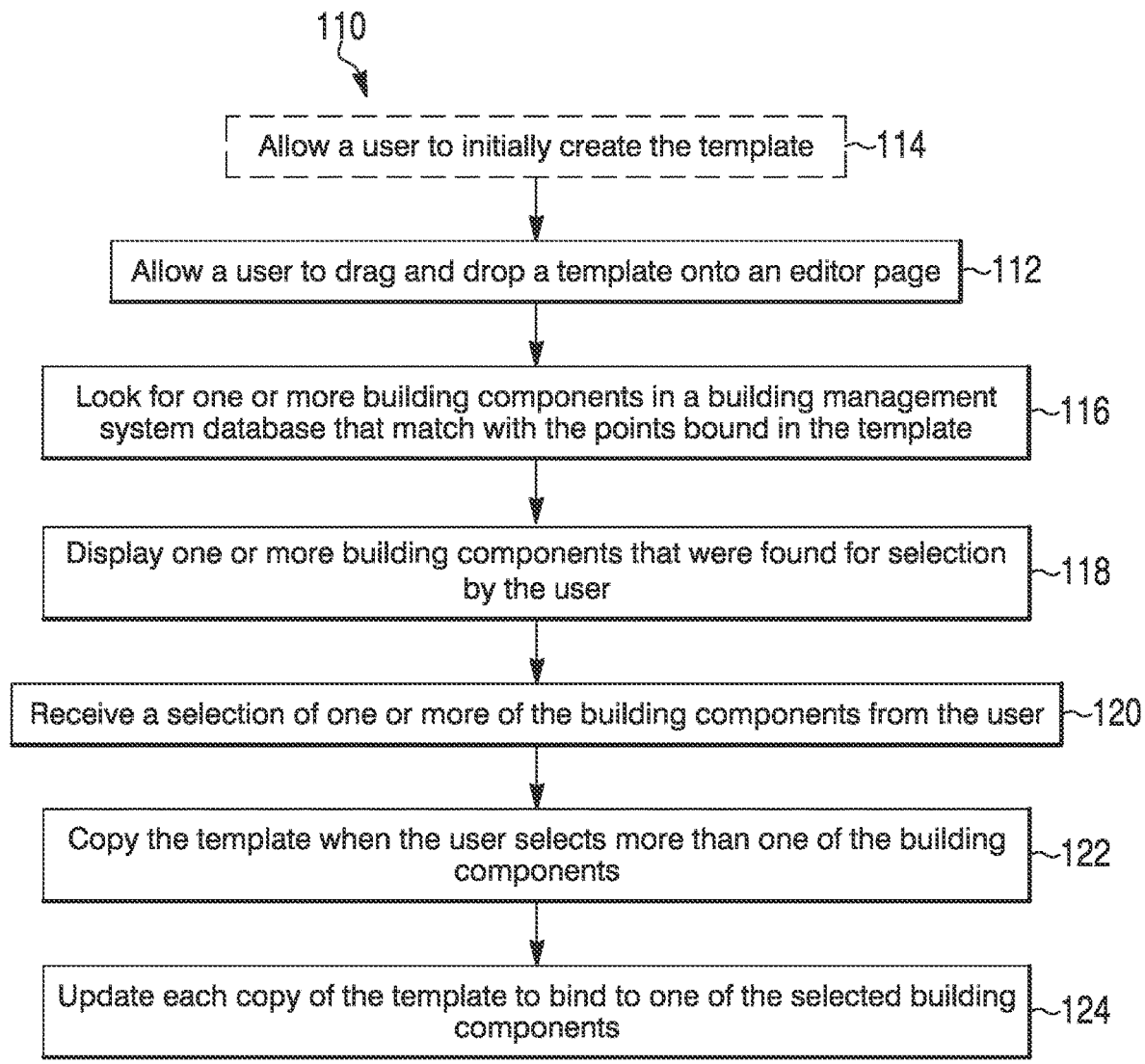
FIG. 6 is a flow diagram showing an illustrative method of configuring a building control system such as that of FIG. 1.

FIG. 6 is a flow diagram showing an illustrative method 110. In the illustrative method of FIG. 6, a user is allowed to drag and drop a template onto an editor page, as indicated at block 112. In some instances, as optionally indicated at block 114, the user is allowed to initially create the template. In other cases, the template may already exist for the user in a library of templates, or may have been created by a previous user, for example. A building management system database is then searched to identify one or more building components that have points that match with the points in the template, as indicated at block 116. When one or more building components are found, those building components are displayed for selection by the user, as indicated at block 118. A selection of one or more of the building components may be received from the user, as indicated at block 120. The template may be copied when the user selects one or more of the building components, as indicated at block 122. Each copy of the template may be updated to bind to a corresponding one of the selected building components, as indicated at block 124. In some cases, a relative address to a point in the template may be updated to an absolute address to the corresponding point in the building management system database. This may improve the efficiency of binding individual graphics to building components.

Figure 7:
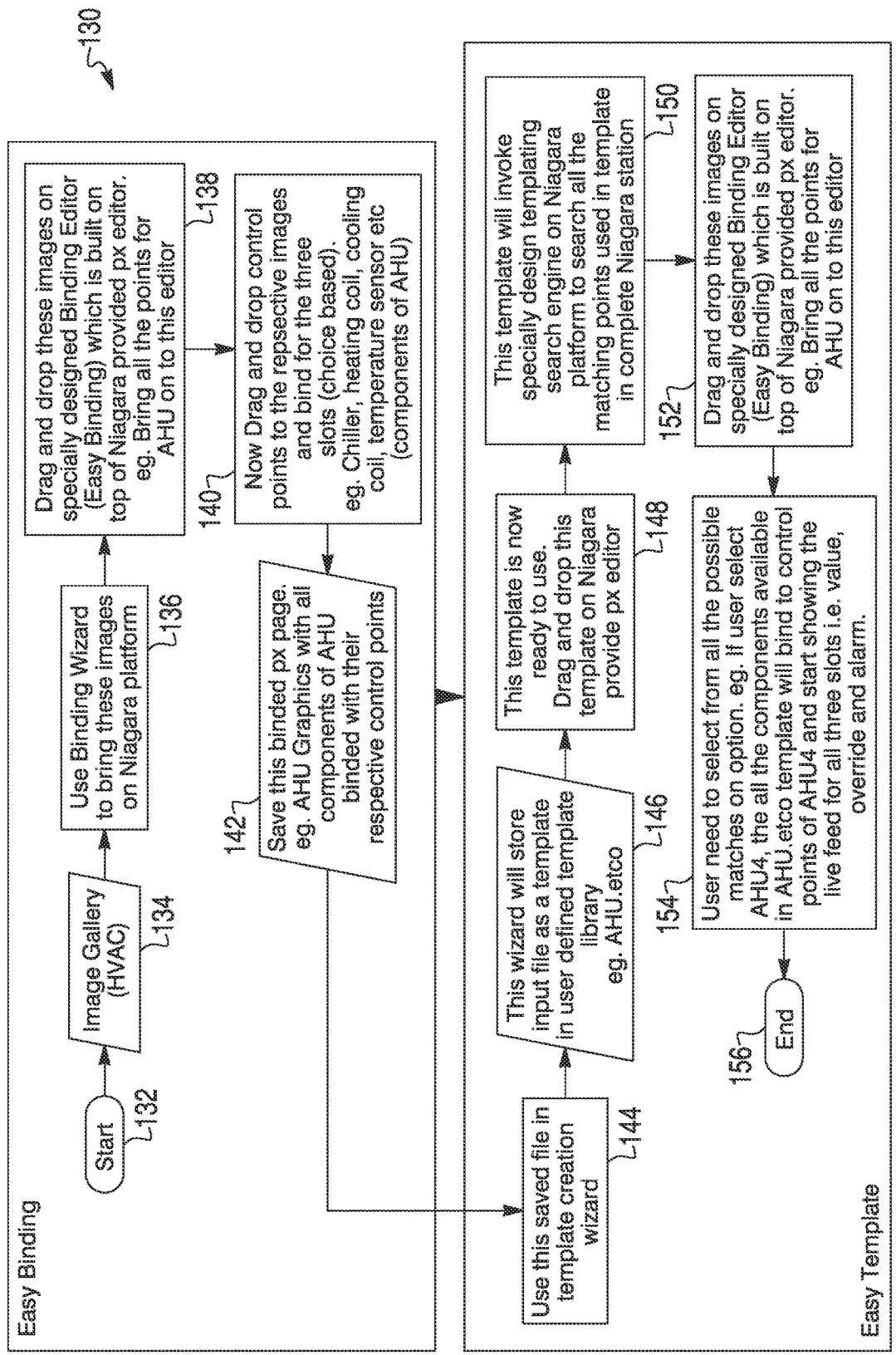
FIG. 7 is a flow diagram showing an illustrative method of configuring an HVAC system.

FIG. 7 is a flow diagram showing an illustrative method 130 of configuring an HVAC system. An HVAC system may be considered as being an example of the building management system 12 shown in FIG. 1. The method 130 begins at a Start block 132. Block 134 references an HVAC image gallery. The HVAC image gallery may include graphical images of a variety of different HVAC components as well as graphical images representing various states of the different HVAC components. The HVAC image gallery may be considered part of a Widget Library discussed above. At block 136, a Binding Wizard is used to bring the HVAC images onto a platform such as but not limited to the Niagara™ platform available from Honeywell International. At block 138, the graphical images from the HVAC image gallery are dragged and dropped onto an Easy Binding editor page. In some instances, the Easy Binding editor page may be built on top of the px editor provided by the Niagara™ platform.

At block 140, the applicable control points may be dragged and dropped onto the applicable HVAC images shown in a Binding Wizard. In some cases, the Binding Wizard may represent an example of the Editor Page 28 as shown in FIG. 1. At block 142, the binded px page is saved. As an example, this may be AHU graphics with all components of the AHU bound with their respective control points. The portion of the method 130 shown in blocks 132 through 142 may be considered as being the Easy Binding portion.

The use of templates start at block 144 and continue through the rest of the method 130. At block 144, a saved binded px page referenced at block 142 may be saved in a template creation wizard. At block 146, the template creation wizard (which may also utilize the Editor Page 28) will store the input file as a template in a user-defined template library. At block 148, the template is ready to be used, and can be dragged and dropped onto the px editor provided by the Niagara™ platform. At block 150, the template may invoke a specialty design templating engine on the Niagara™ platform in order to search for all building components in the building management system with matching points. At block 152, this results in providing users with all of the relevant equipment for a selection. For example, if the template pertains to an AHU, all other AHUs with matching points will be available for selection. The user then selects the appropriate equipment (e.g. building components) at block 154. If, for example, the user selects AHU4, then all of the components in the AHU template may be displayed and will bind to the control points for AHU4. During operation, and in one example, a live feed for three different points (i.e., value, override and alarm) will be displayed on an operator console. The method 130 terminates at an END block 156.

Figure 8:
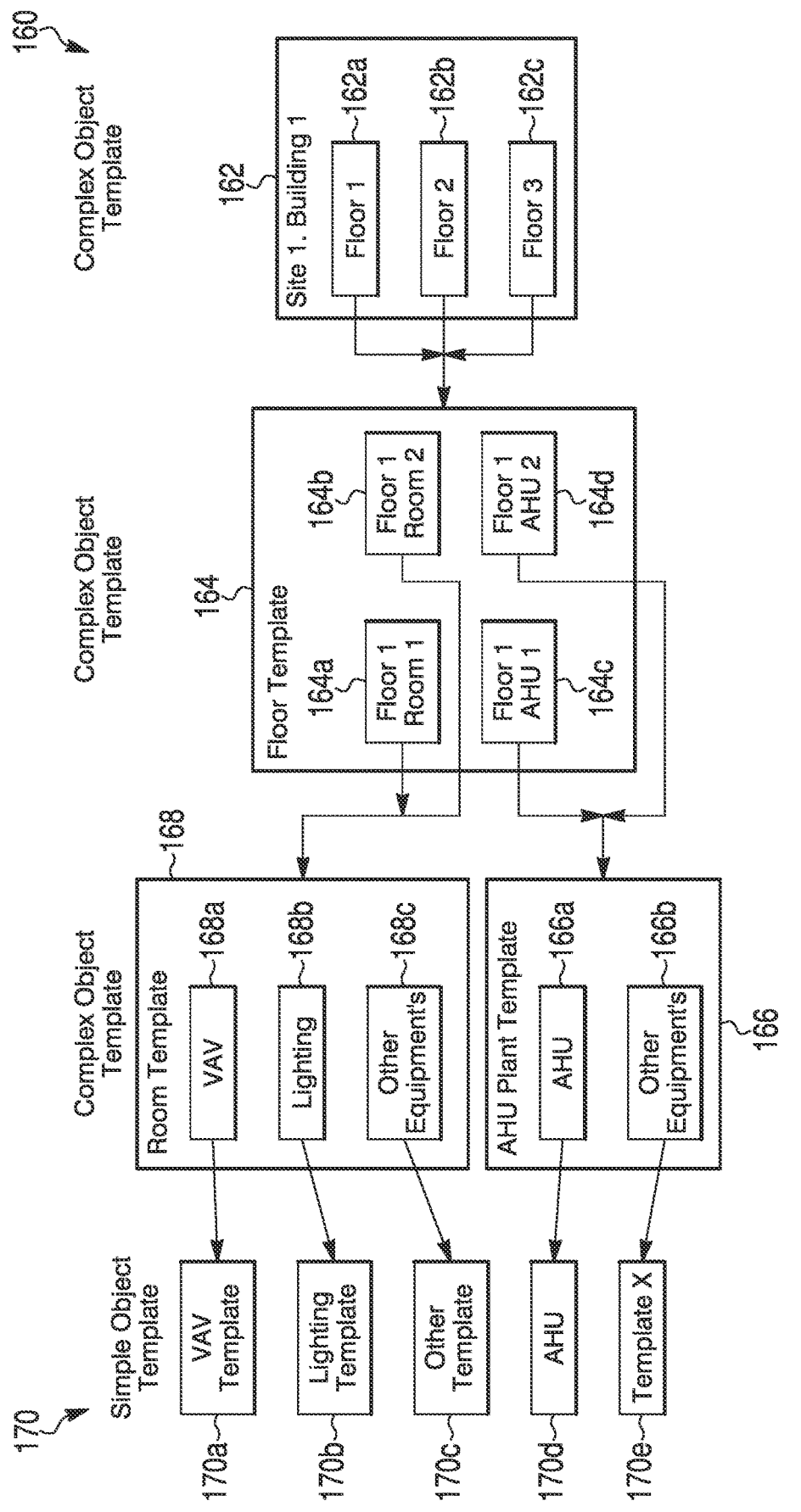
FIG. 8 is a graphical representation of possible arrangements between templates that can be created and stored using the present system.

FIG. 8 is a graphical representation 160 of possible arrangements between templates in a system. The end to end workflow of creating a graphical template and performing automated binding based on AI (artificial intelligence) may be automated. In the example show, the graphical representation 160 includes a Site 1 Building 1 section 162. It can be seen that Site 1 Building 1 includes an icon 162a representing a first floor, an icon 162b representing a second floor and an icon 162c representing a third floor. This may be considered as being a complex object template. The Floor Template 164 includes icons 164a and 164b that represent different rooms on the first floor as well as icons 164c and 164d that represent different AHUs located on the first floor. This can be considered as another example of a complex object template as it references both location and equipment.

The graphical representation 160 includes an AHU Template 166 and a Room Template 168. The AHU template 166 includes an icon 166a representing an AHU and an icon 166b representing other equipment. The Room Template 168 includes an icon 168a representing a Variable Air Volume (VAV) box, an icon 168b representing lighting and an icon 168c representing other equipment. The AHU template 166 and the Room Template 168 also represent complex object templates. The graphical representation 160 also includes a set 170 of simple object templates, including a VAV Template 170a, a Lighting Template 170b, an Other Template 170c, an AHU Template 170d and a Template X 170e.

Figure 9:
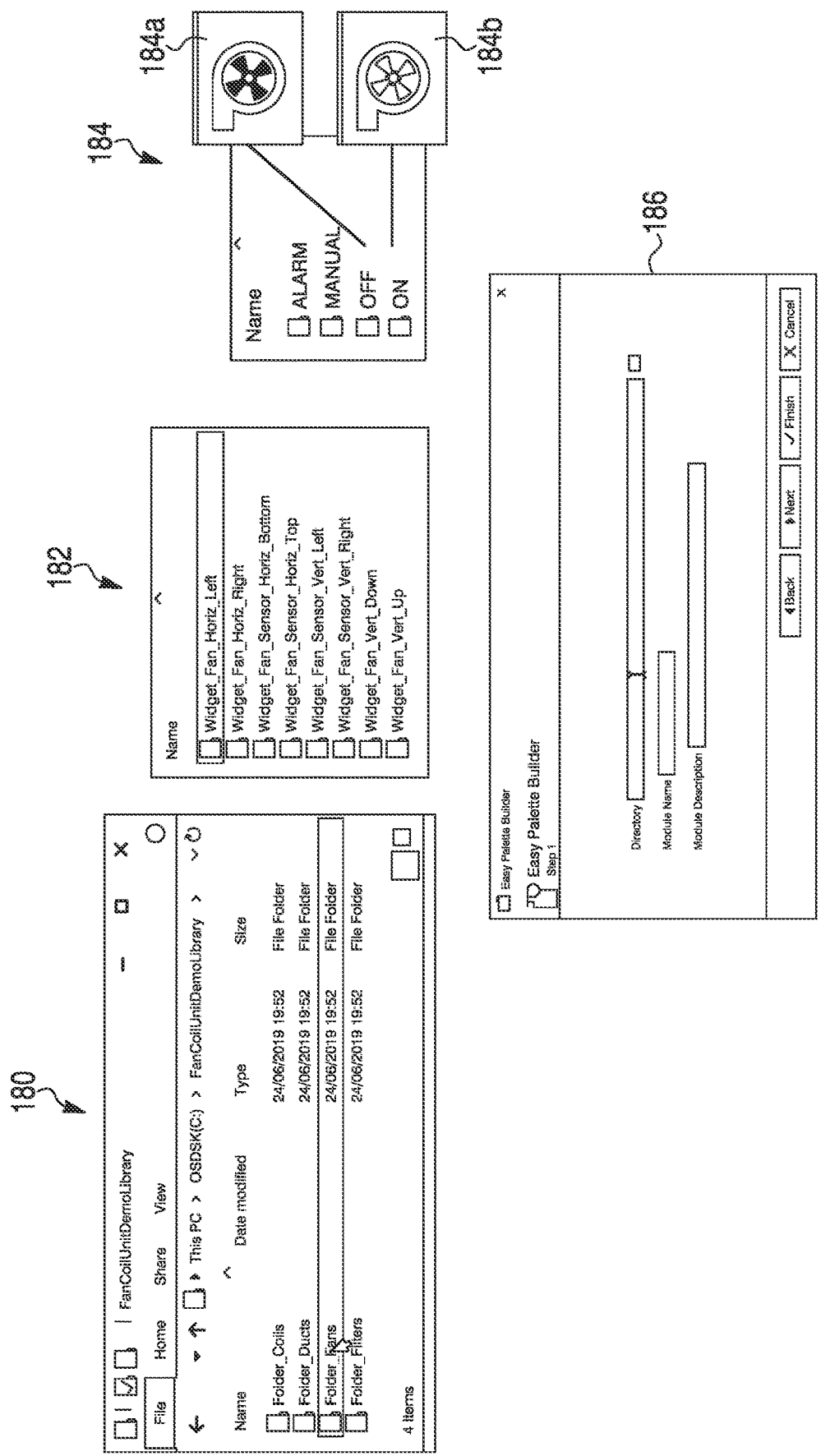
FIG. 9 schematically illustrates a palette builder for building out a Widget library.

FIG. 9 schematically illustrates creating a palette builder for building out a Widget library. A section 180 provides an example of creating folders in the palette. In this particular example, folders are created using folder names FOLDER xxxx. To illustrate, the section 180 includes folders named Folder Coils, Folder Duct, Folder Fans and Folder Filters. It will be appreciated that these names are illustrative only. A section 182 provides an example of the folder names used to create widgets. As shown, the folders used to create widgets may have a WIDGET-_xxxx naming convention. The section 184 provides an example of handling the graphical images that may be used for a particular widget. As shown in section 184, there may be an ALARM graphic, a MANUAL graphic, an OFF graphic and an ON graphic. If a folder named ALARM exists, the widget will use this image (not illustrated) when the alarm state is true. If a folder named MANUAL exists, the widget will use this image (not illustrated) when the manual override is in operation. If any folders do not exist, the widget may use a default alarm and manual image overlay. An OFF graphic 184a and an ON graphic 184b are illustrated. The graphics may be in .bmp format, .png format or .svg format. Animated files may be used (e.g. animating a fan rotating for a fan ON state). Section 186 shows what happens when the files are in the right folder/file structure to be able to run the palette creator tool in IQVISION in order to create the palette.

Figure 10:
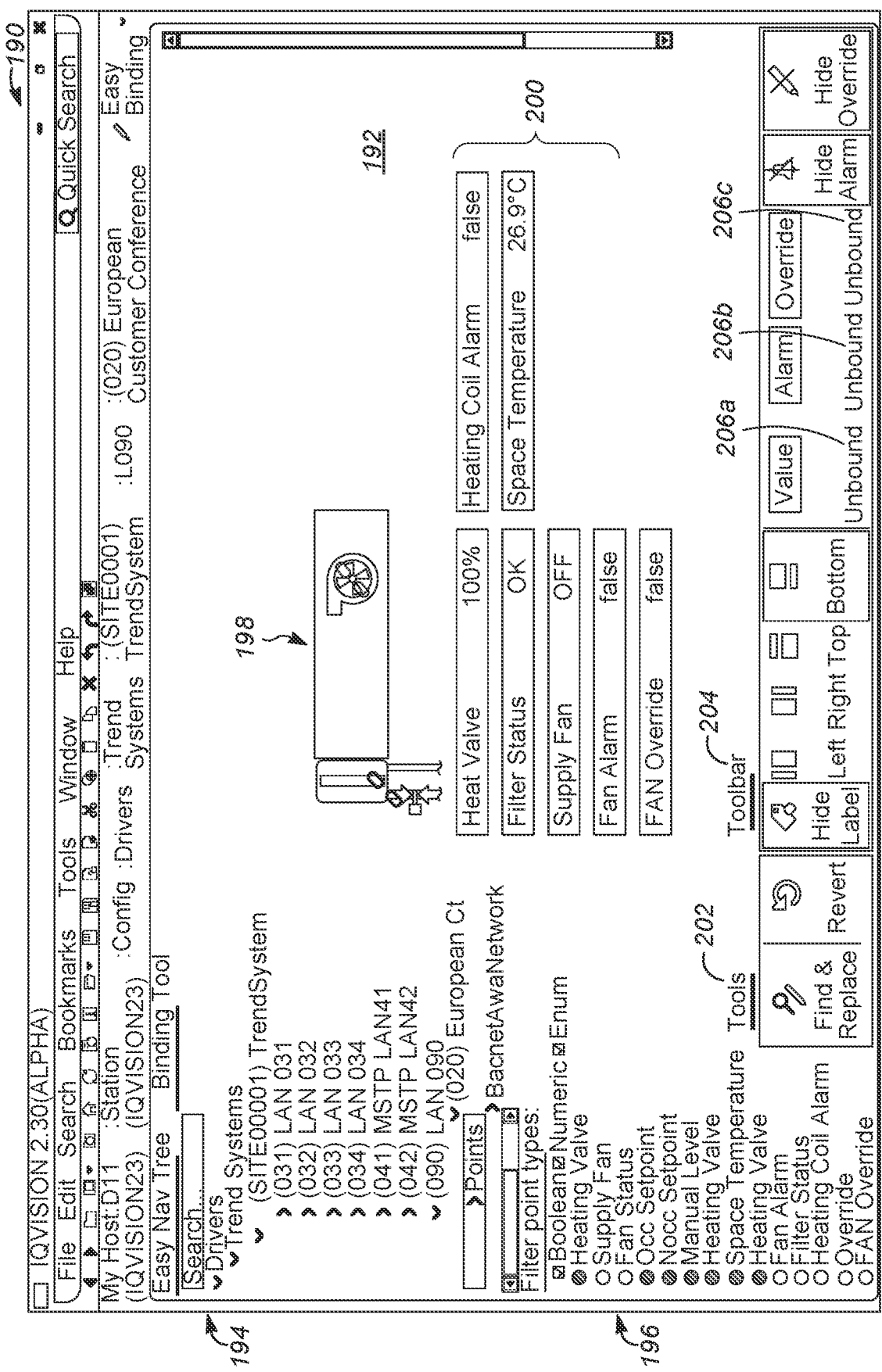
FIGS. 10 through 12 are screen captures of an illustrative Editor Page used for auto binding graphics selected from the Widget library to points of selected components in a building management system.

FIG. 10 is a screen capture of an illustrative Editor Page 190. The Editor Page 190 includes a working space 192, a navigational tree 194 and filter point types 196. The navigational tree 194 may be used to help a user find points in the building management system. The filter point types 196 may be used to reduce the number of points shown. As seen, a user has dragged and dropped a graphical image 198 onto the working space 192 of the Editor page 190. The graphical image 198 includes a number of icons 200 showing current status of the HVAC equipment represented by the graphical image 198. The Editor Page 190 includes tools section 202 and a toolbar 204 that may each be used by the user. As shown in the toolbar 204, Value, Alarm and Override slots are not yet bound, as seen at 206a, 206b and 206c, respectively.

Figure 11:
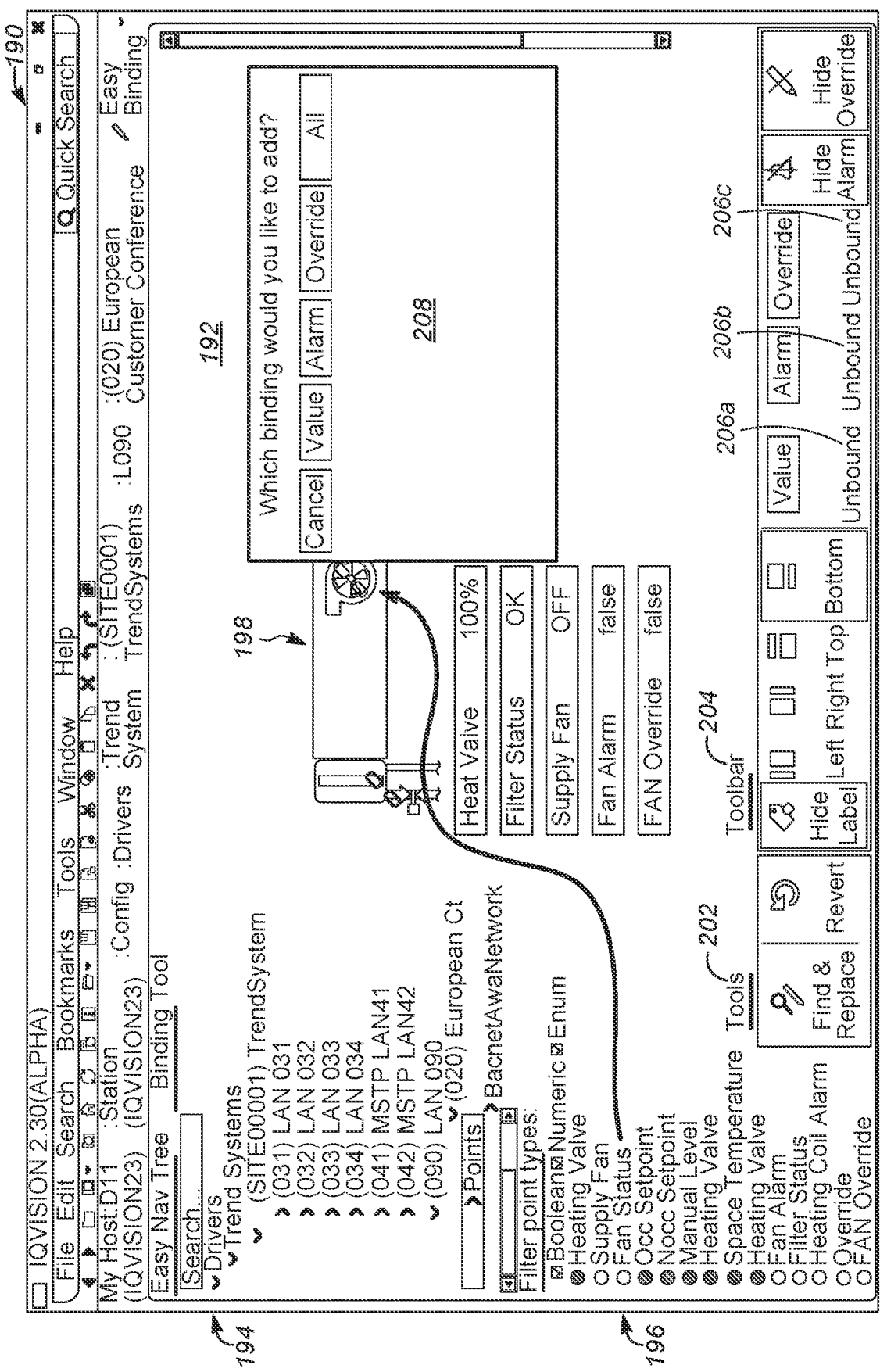

FIG. 11 is a screen capture of the illustrative Editor Page 190 after a user has selected, dragged and dropped points onto the graphical image 198 of FIG. 10. In FIG. 11, the Editor Page 190 includes a popup window 208 that allows the user to specify which binding they wish to add for the equipment represented by the graphical image 198.

Figure 12:
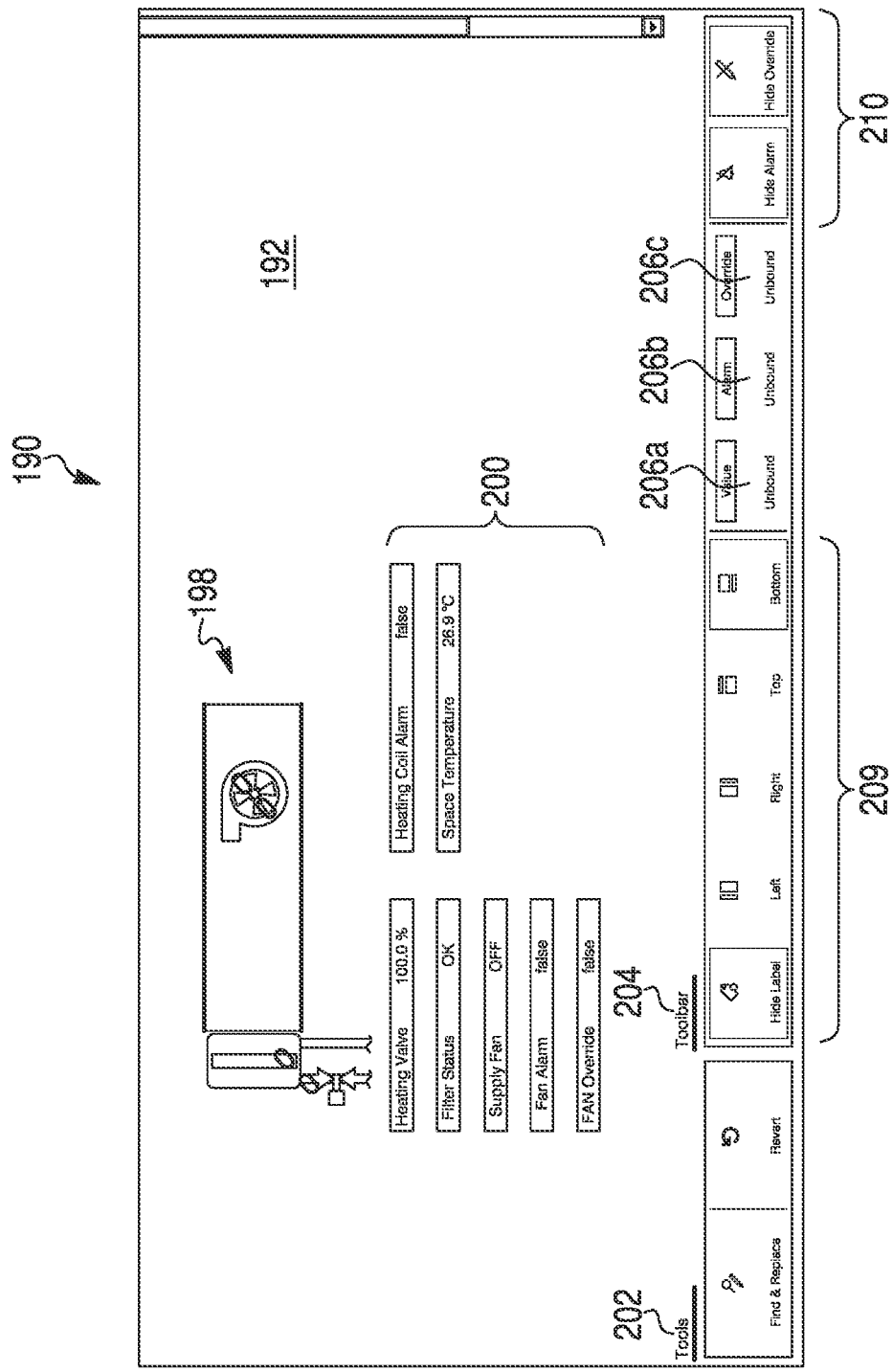

FIG. 12 is a screen capture of the illustrative Editor Page 190. In FIG. 12, it can be seen that the toolbar 204 includes icons 209 that may be used to specify the relative position that a label is to be displayed. Icons 210 may be used to control alarms and override images. The icons 206am, 206b, 206c can be seen as indicating the Value, Alarm and Override slots have now been bound.

Figure 13:
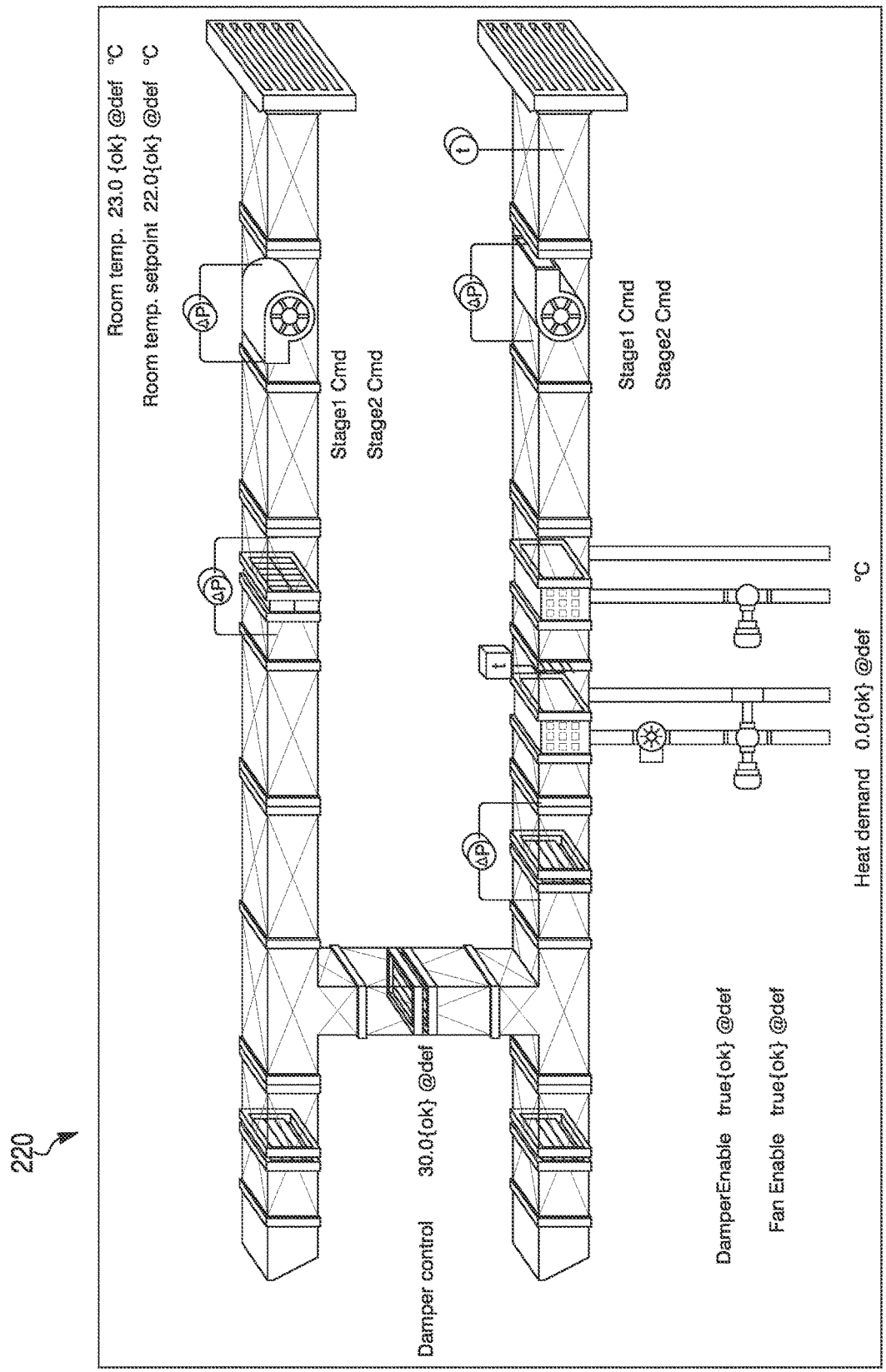
FIG. 13 is a screen capture providing a three-dimensional representation of an illustrative air handling system.
Figure 14:
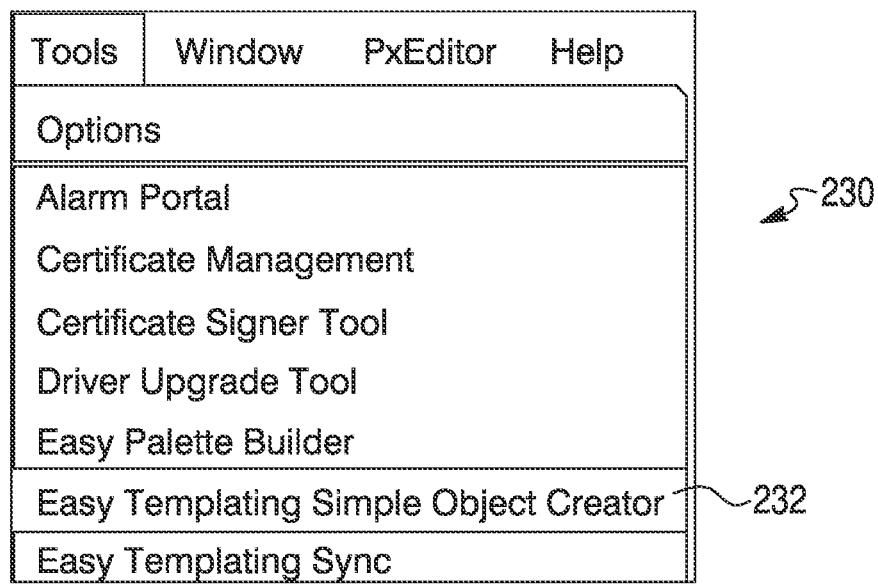
FIG. 14 shows an illustrative pull-down menu.
Figure 15:
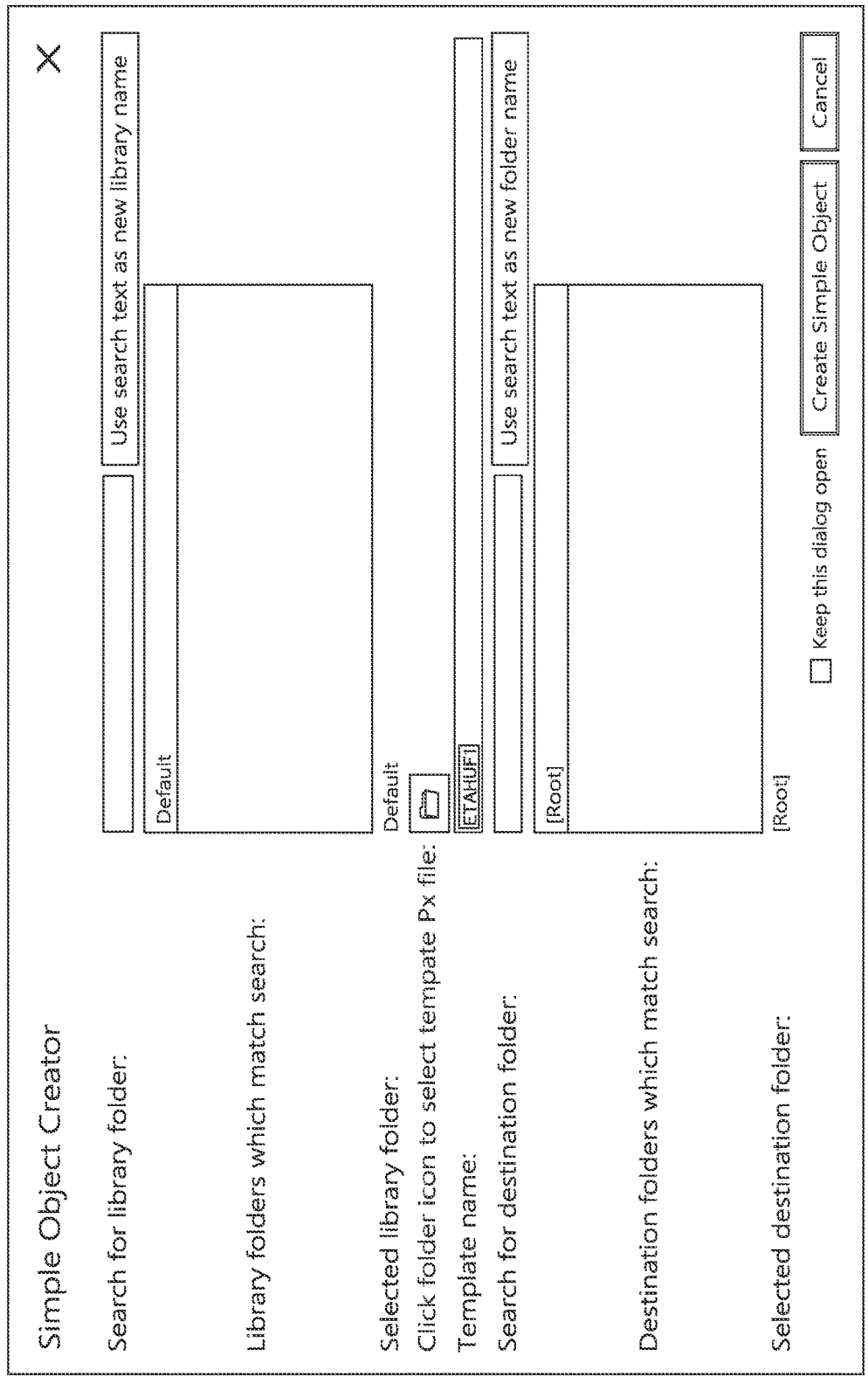
FIGS. 15 through 17 are screen captures showing use of graphic template objects in templating.

FIG. 13 is a screen capture providing a three-dimensional graphical representation 220 of an illustrative air handling system. It can be seen that some of the equipment included in the three-dimensional graphical representation 220, including several blowers and filters, have been at least partially configured. Selecting a tools icon may cause a pull-down menu 230, as seen in FIG. 14, to be displayed. It can be seen that the pull-down menu 230 includes several options, one of which is an Easy Templating menu 232. Selecting the Easy Templating menu 232 causes a screen 234 to be displayed, as shown in FIG. 15. The screen 234 allows a graphic template object to be created.

Figure 16:
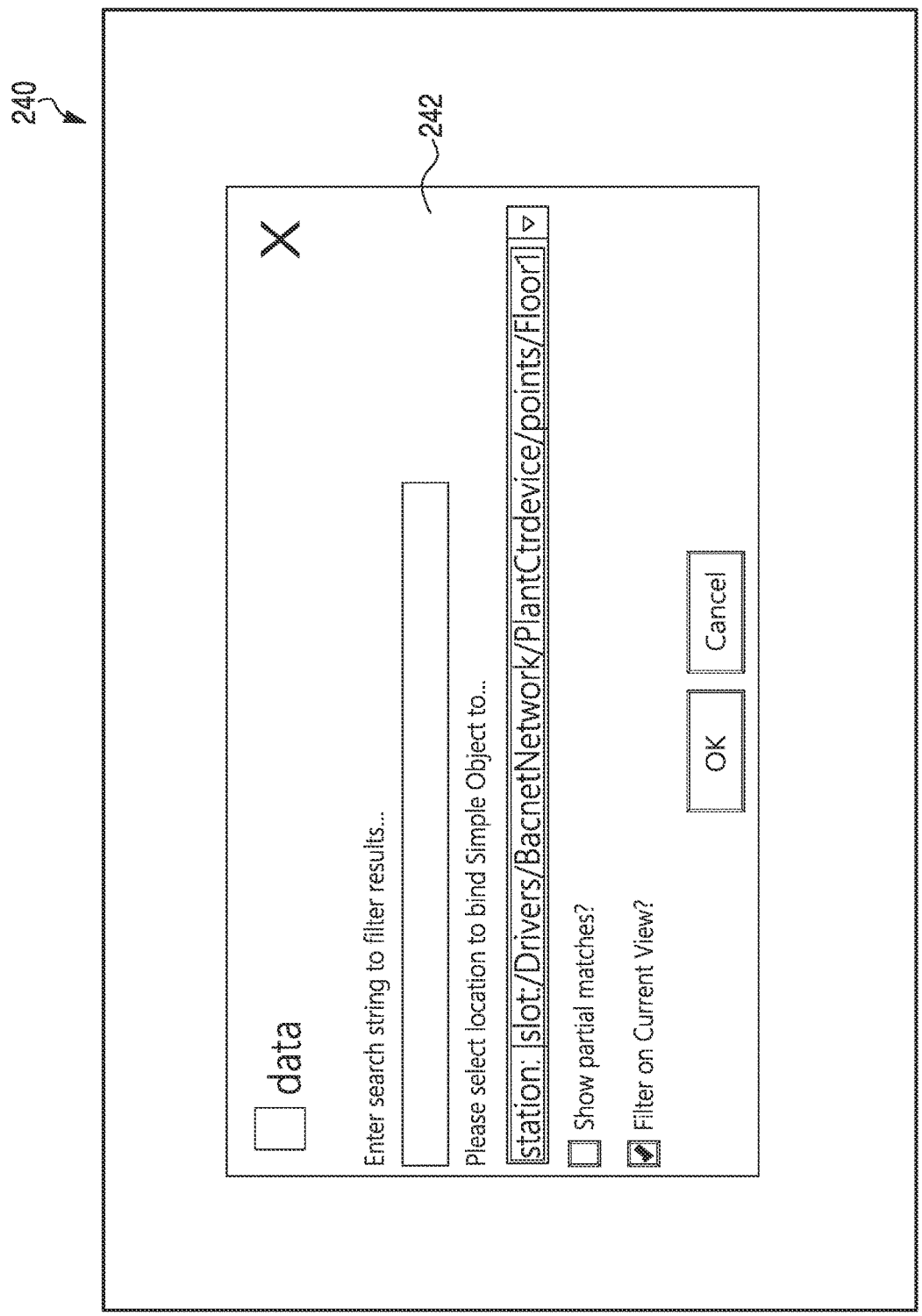
Figure 17:
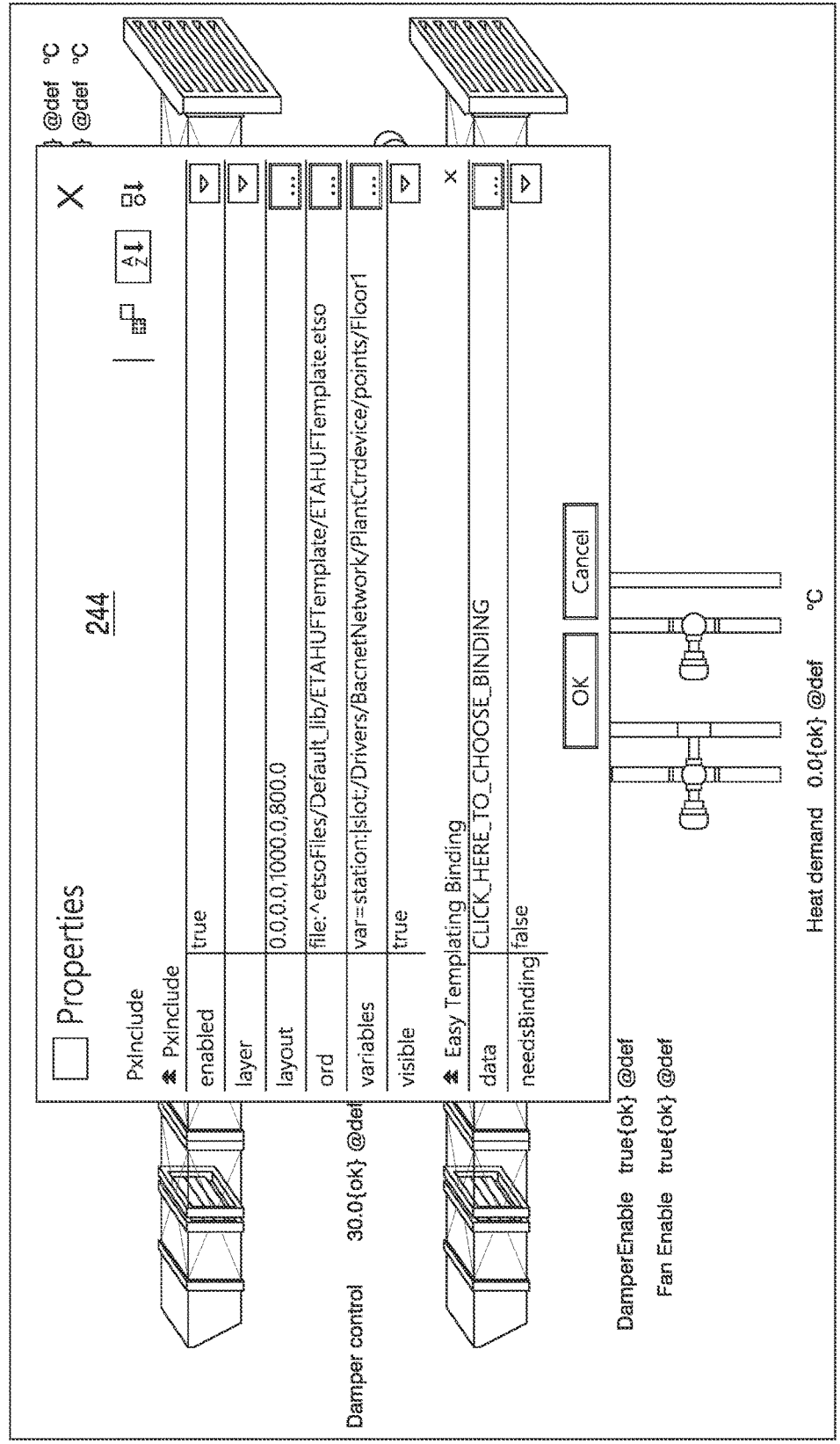

FIG. 16 is a screen capture of a screen 240 that may be displayed when using graphic template objects. The screen 240 includes a search option 242 that allows the user to search for particular graphic template objects. Once a selection has been made, the resources needed will be copied over to the running station, as shown in FIG. 17. FIG. 17 is similar to FIG. 13 in showing the three-dimensional graphical representation 220 of the illustrative air handling system, but includes a popup 244 that includes the necessary information for configuring the equipment.

Figure 18:
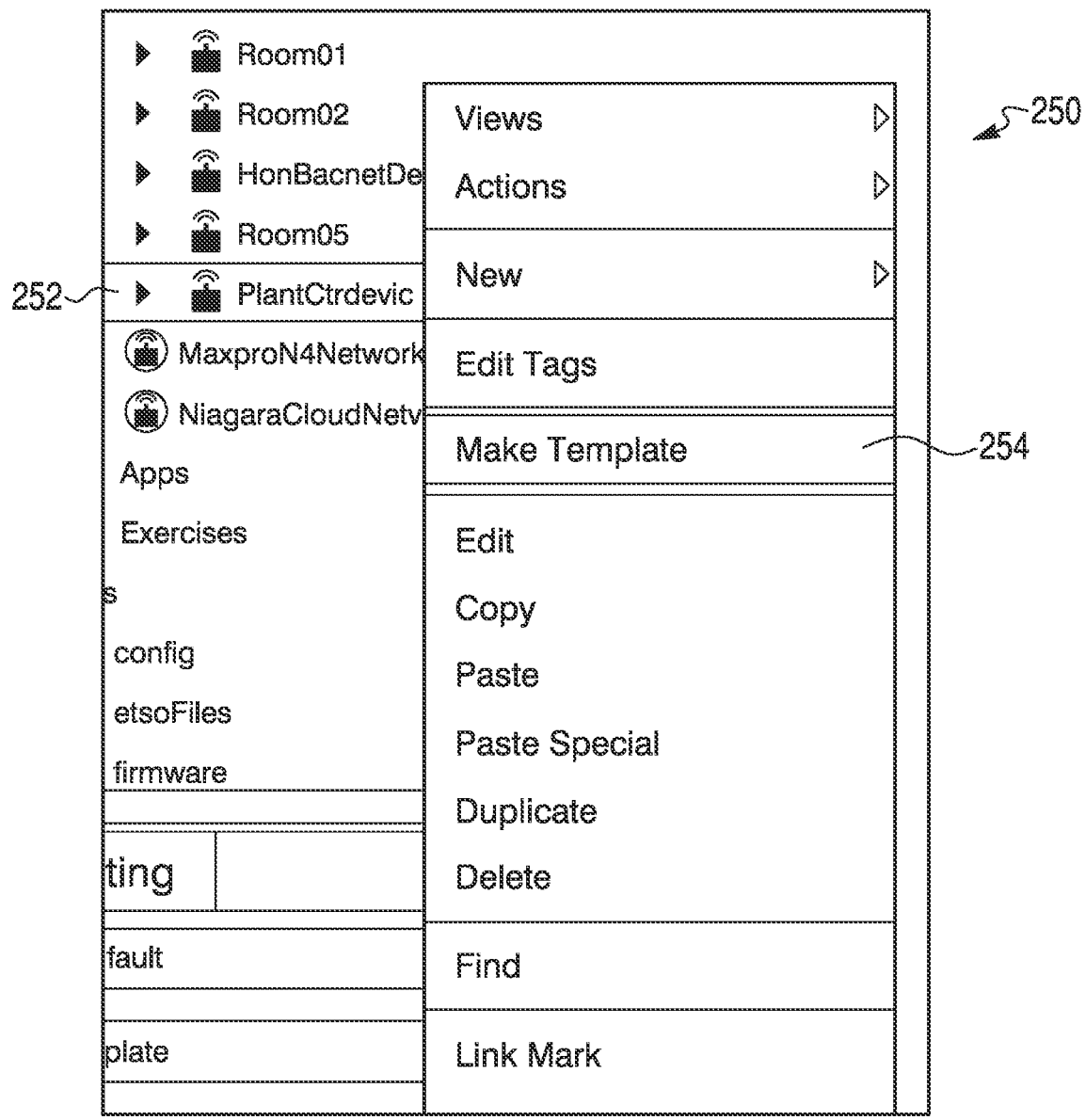
FIG. 18 shows an illustrative pull-down menu useful in creating an equipment template.
Figure 19:
FIG. 19 is an illustrative screen capture resulting from selection of "Make Template" option from the pull-down menu show in FIG. 18.
Figure 20:
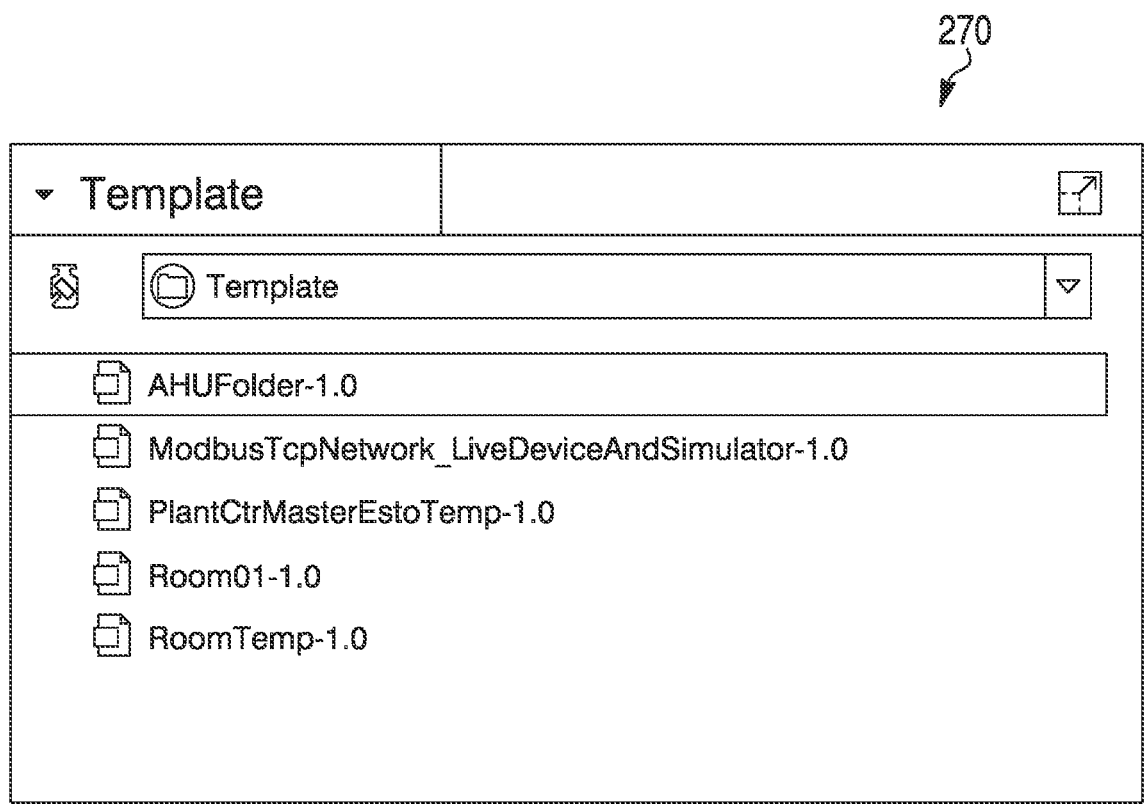

FIG. 18 is a pull-down menu 250 that may be accessed by clicking on a particular piece of equipment 252. The pull-down menu 250 includes a number of menu items, including a Make Template menu 254. Selecting the Make Template menu 254 causes display of a screen 260 as shown in FIG. 19. The screen 260 allows the user to enter a variety of details for the template, including its name and other items. The created template 270 is shown for example in FIG. 20.

Figure 21:
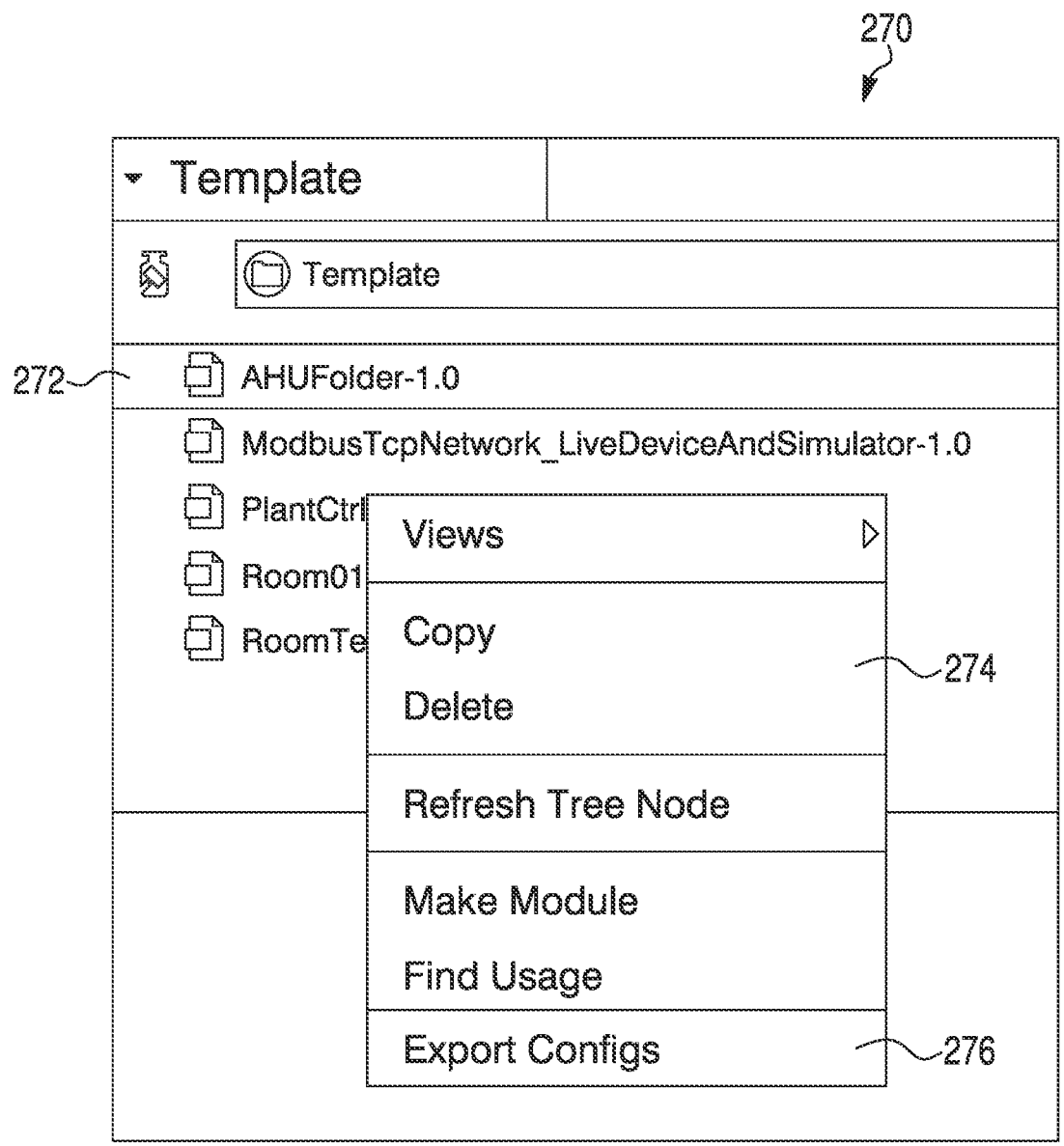
Figure 22:
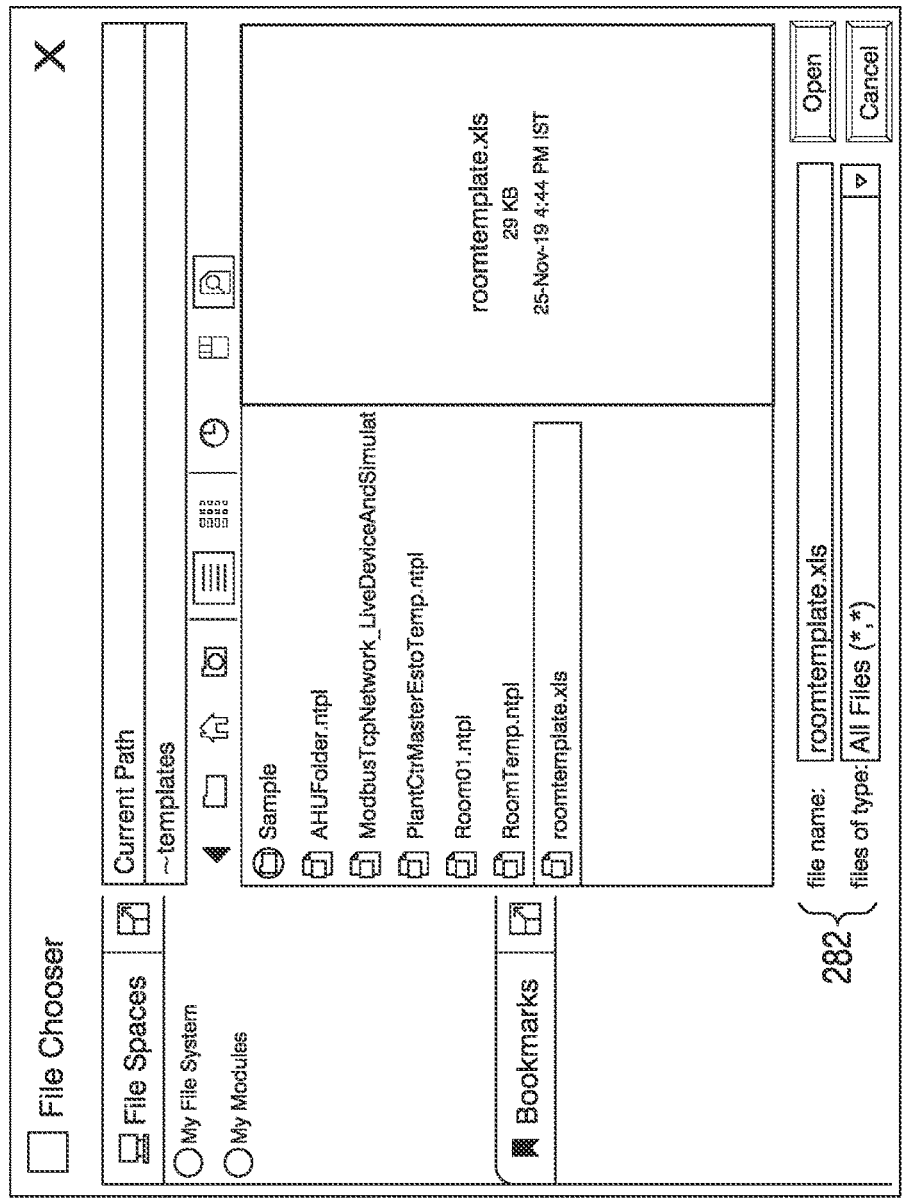

As seen in FIG. 21, right clicking on a particular template 272 causes a pull-down menu 274 to appear. The pull-down menu 274 includes a variety of menu items, including an Export Config option 276. Selecting the Export Config option 276 causes a screen 280 to be displayed, as seen in FIG. 22. The screen 280 includes a section 282 that allows a user to name an excel template file. FIG. 23 shows a screen 290 that shows the data included in the excel template file.

Figure 24:
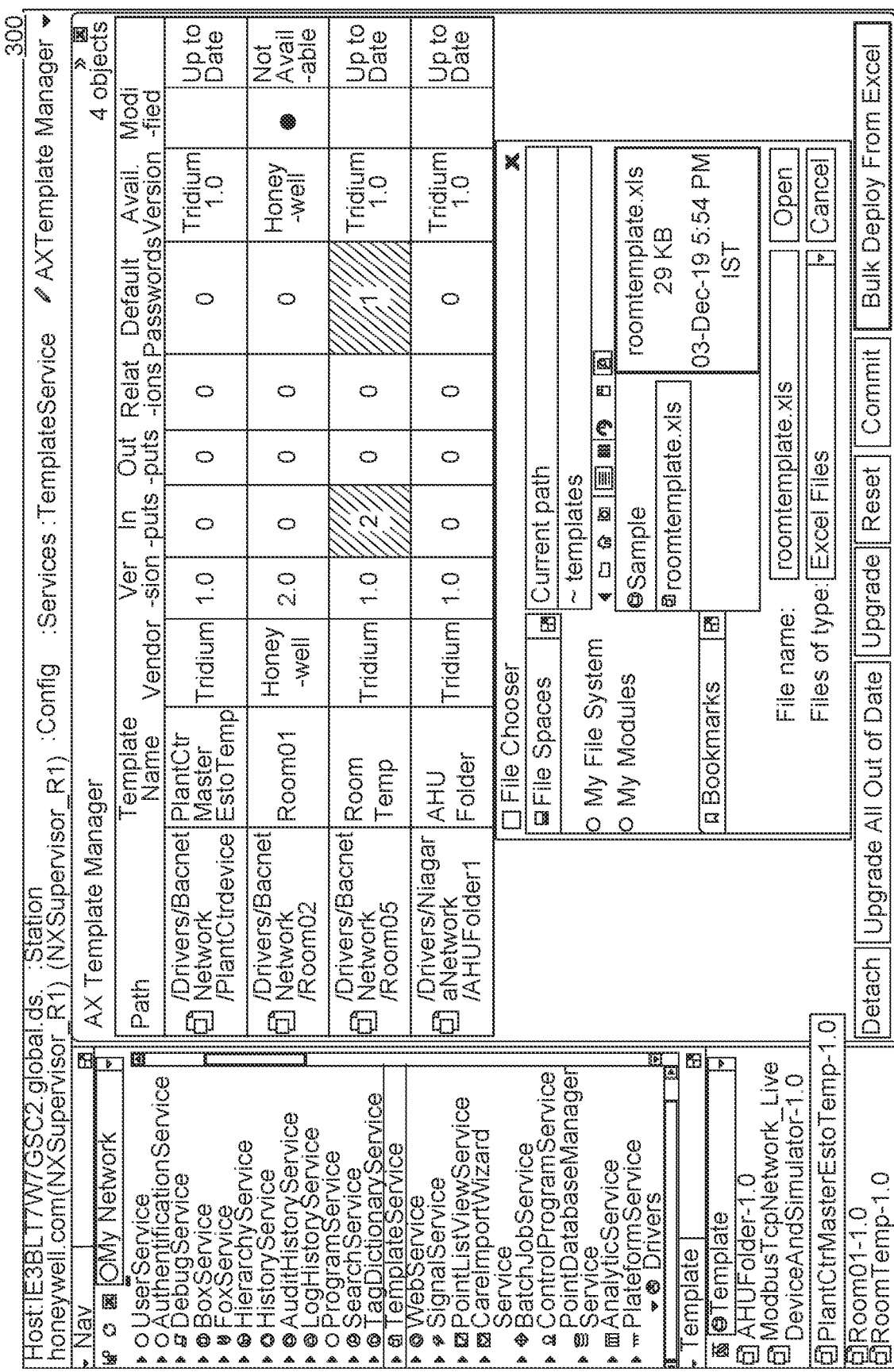
FIG. 24 is an illustrative screen capture pertaining to bulk deployment of equipment templates.

FIG. 24 shows a screen 300 pertaining to bulk deployment of equipment templates. The screen 300 can be reached by going to Template Service and clicking on "Bulk Deploy from Excel" option, then the modified excel file and open.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of configuring a building management system for operation, the building management system including a plurality of building system components, the method comprising:
   accessing a widget library, the widget library comprising a plurality of individual graphical images that each graphically represent operation of one or more building system components;
   dragging and dropping one or more individual images from the widget library onto an editor page;
   dragging and dropping one or more points of the one or more building system components onto each of one or more of the individual graphical images on the editor page;
   in response to dragging and dropping the one or more points onto each of one or more of the individual graphical images on the editor page, automatically binding the one or more points with the respective individual graphical image, wherein the respective individual graphical image is configured to reference a current value or current state of one or more of the bound points and visually display an indication of the current value or current state;
   saving the individual graphical images along with the binding with their respective one or more points as a template, wherein the binding with each of their respective one or more points is represented as a relative address;
   performing a search of the building management system to find one or more building system components that match with the points bound in the template;
   displaying one or more of the building system components that match with the points bound in the template;
   receiving a selection of a selected one of the one or more building system components that match with the points bound in the template;
   instantiating the template;
   updating the relative address of the bindings in the instantiated template to bind to the selected one of the one or more building system components; and
   displaying the one or more individual graphical images of the instantiated template along with current values for the one or more points bound to the selected one of the one or more building system components.

2. The method of claim 1, further comprising:
operating the building management system; and
displaying the one or more individual graphical images associated with the instantiated template along with current values for the one or more points bound to the one or more individual graphical images associated with the instantiated template.

3. The method of claim 1, wherein the widget library comprises a plurality of point status images each corresponding to a different state of a point.

4. The method of claim 3, wherein the plurality of point status images are bound to one or more of the points, and wherein a corresponding one of the point status images is displayed according to a current state of the respective point.

5. The method of claim 3, wherein the plurality of point status images comprises one or more of an ON status image, an OFF status image, a MANUAL OVERRIDE status image and an ALARM state image.

6. The method of claim 1, wherein the plurality of individual graphical images comprise a graphical image that represents an Air Handling Unit (AHU) that includes one or more of a chiller, a heating coil, a cooling coil and a temperature sensor, and wherein dragging and dropping the graphical image that represents the AHU from the widget library onto an editor page causes one or more points associated with an AHU to be available for dragging and dropping.

7. The method of claim 6, wherein the graphical image that represents an Air Handling Unit (AHU) includes two or more different graphical images each representing a different function of the AHU, the method comprising:

dragging and dropping one or more points onto each of the two or more different graphical images representing a different function of the AHU on the editor page;

in response to dragging and dropping one or more points onto each of the two or more different graphical images representing a different function of the AHU on the editor page, automatically binding the one or more points with the respective ones of the two or more different graphical images representing a different function of the AHU.

8. The method of claim 7, wherein one of the two or more different graphical images represents a cooling function of the AHU.

9. The method of claim 7, wherein one of the two or more different graphical images represents a heating function of the AHU.

10. The method of claim 7, wherein one of the two or more different graphical images represents a fan function of the AHU.

11. A non-transitory, computer-readable storage medium having stored thereon instructions that when executed by one or more processors causes the one or more processors to:
    allow a user access to a widget library, the widget library comprising a plurality of individual graphical images that each represent operation of one or more building system components of a building management system;
    allow a user to drag and drop one or more individual graphical images from the widget library onto an editor page;
    allow a user to drag and drop one or more points of the one or more building system components onto each of one or more of the individual graphical images on the editor page, wherein the one or more points for one or more of the building system components report a current state or current status of the respective building system component;
    automatically bind the one or more points with the respective individual graphical image in response to a user dragging and dropping the one or more points onto each of one or more of the individual graphical images on the editor page;
    save the individual graphical images along with the binding with their respective one or more points as a template, wherein the binding with each of their respective one or more points is represented as a relative address;
    perform a search of the building management system to find one or more building system components that match with the points bound in the template;
    display one or more of the building system components that match with the points bound in the template;
    receive a selection of a selected one of the one or more building system components that match with the points bound in the template;
    instantiate the template;
    update the relative address of the bindings in the instantiated template to bind to the selected one of the one or more building system components; and
    display the one or more individual graphical images of the instantiated template along with current values for the one or more points bound to the selected one of the one or more building system components.

12. The non-transitory, computer-readable storage medium of claim 11, wherein the instructions further cause the one or more processors to:
    operate the building management system; and
    display the one or more individual graphical images associated with the instantiated template along with the current state or current status for the respective one or more points bound to the one or more individual graphical images associated with the instantiated template.

13. The non-transitory, computer-readable storage medium of claim 11, wherein the widget library comprises a plurality of point status images each corresponding to a different state or status reported by a bound point.

14. The non-transitory, computer-readable storage medium of claim 13, wherein the plurality of point status images are bound to one or more of the points, and wherein a corresponding one of the point status images is displayed according to a current state or current status of the respective point.

15. A non-transitory, computer-readable storage medium having stored thereon instructions that when executed by one or more processors causes the one or more processors to:
    allow a user access to a widget library, the widget library comprising a plurality of individual graphical images that each represent operation of one or more building system components of a building management system;
    allow a user to drag and drop one or more individual graphical images from the widget library onto an editor page;
    allow a user to drag and drop one or more points of the one or more building system components onto each of one or more of the individual graphical images on the editor page, wherein the one or more points for one or more of the building system components correspond to one or more of a valve position, a filter status, a fan status, an alarm status and a sensed value;
    automatically bind the one or more points with the respective individual graphical image in response to a user dragging and dropping the one or more points onto each of one or more of the individual graphical images on the editor page;
    save the individual graphical images along with the binding with their respective one or more points as a template, wherein the binding with each of their respective one or more points is represented as a relative address;
    perform a search of the building management system to find one or more building system components that match with the points bound in the template;
    display one or more of the building system components that match with the points bound in the template;
    receive a selection of a selected one of the one or more building system components that match with the points bound in the template;
    instantiate the template;
    update the relative address of the bindings in the instantiated template to bind to the selected one of the one or more building system components; and
    display the one or more individual graphical images of the instantiated template along with current values for the one or more points bound to the selected one of the one or more building system components.

16. The non-transitory, computer-readable storage medium of claim 15, wherein the instructions further cause the one or more processors to:
    operate the building management system; and
    display the one or more individual graphical images associated with the instantiated template along with the respective one or more points bound to the one or more individual graphical images associated with the instantiated template.

\* \* \* \* \*